(12) United States Patent
Sahlin et al.

(10) Patent No.: US 9,581,739 B2
(45) Date of Patent: Feb. 28, 2017

(54) TRANSFLECTIVE ARTICLES AND LIGHT ASSEMBLIES

(75) Inventors: Jennifer J. Sahlin, Minneapolis, MN (US); Mark E. Napierala, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/518,256

(22) PCT Filed: Dec. 14, 2010

(86) PCT No.: PCT/US2010/060233
§ 371 (c)(1),
(2), (4) Date: Jun. 21, 2012

(87) PCT Pub. No.: WO2011/078988
PCT Pub. Date: Jun. 30, 2011

(65) Prior Publication Data
US 2012/0268940 A1  Oct. 25, 2012

Related U.S. Application Data

(60) Provisional application No. 61/288,596, filed on Dec. 21, 2009.

(51) Int. Cl.
| | | |
|---|---|---|
| *F21V 11/02* | (2006.01) |
| *G02B 5/04* | (2006.01) |
| *G02B 5/02* | (2006.01) |
| *G02B 5/124* | (2006.01) |
| *G02F 1/1335* | (2006.01) |
| *F21S 8/10* | (2006.01) |

(52) U.S. Cl.
CPC ............ *G02B 5/045* (2013.01); *F21S 48/2212* (2013.01); *F21S 48/2218* (2013.01); *G02B 5/0289* (2013.01); *G02B 5/124* (2013.01); *F21S 48/215* (2013.01); *G02F 1/133555* (2013.01)

(58) Field of Classification Search
CPC ........... G02B 5/0289; B60Q 1/22; B60Q 1/44; B60Q 2400/20
See application file for complete search history.

(56) References Cited

U.S. PATENT DOCUMENTS

| | | |
|---|---|---|
| 4,383,290 A | 5/1983 | Binder et al. |
| 4,588,258 A | 5/1986 | Hoopman |
| 4,775,219 A | 10/1988 | Appeldorn |
| 5,122,902 A | 6/1992 | Benson |
| 5,138,488 A | 8/1992 | Szczech |
| 5,450,235 A | 9/1995 | Smith |
| 5,450,285 A | 9/1995 | Schlemmer |
| 5,840,405 A | 11/1998 | Shusta |

(Continued)

FOREIGN PATENT DOCUMENTS

| | | |
|---|---|---|
| EP | 0715988 | 6/1996 |
| JP | S58-169601 U | 11/1983 |

(Continued)

*Primary Examiner* — Jong-Suk (James) Lee
*Assistant Examiner* — Alexander Garlen
(74) *Attorney, Agent, or Firm* — Robert S. Moshrefzadeh

(57) ABSTRACT

Transflective articles comprising a first layer having a first, outer major surface having a plurality of apertures therein; and a second layer having a major transflective surface. The transflective articles are useful, for example, in light assemblies.

12 Claims, 8 Drawing Sheets

(56) References Cited

U.S. PATENT DOCUMENTS

| | | | |
|---|---|---|---|
| 6,029,382 A * | 2/2000 | Kochanowski | 40/582 |
| 6,206,554 B1 | 3/2001 | Schuster | |
| 6,280,822 B1 | 8/2001 | Smith | |
| 6,287,670 B1 | 9/2001 | Benson | |
| 6,296,382 B1 | 10/2001 | Hamelbeck | |
| 6,531,230 B1 | 3/2003 | Weber | |
| 6,563,993 B1 | 5/2003 | Imamura | |
| 6,752,505 B2 | 6/2004 | Parker | |
| 6,771,335 B2 | 8/2004 | Kimura | |
| 6,924,014 B2 | 8/2005 | Ouderkirk | |
| 7,192,148 B2 * | 3/2007 | Tsai et al. | 362/29 |
| 7,329,012 B2 | 2/2008 | Smith | |
| 7,345,824 B2 * | 3/2008 | Lubart et al. | 359/641 |
| 7,364,421 B2 | 4/2008 | Erickson | |
| 7,399,106 B2 | 7/2008 | Reading | |
| 7,515,229 B2 * | 4/2009 | Chang | 349/114 |
| 7,537,374 B2 * | 5/2009 | Schardt et al. | 362/623 |
| 7,815,355 B2 * | 10/2010 | Thompson et al. | 362/560 |
| 2002/0018349 A1 | 2/2002 | Aikawa | |
| 2002/0034080 A1 | 3/2002 | Tamai | |
| 2003/0082314 A1 * | 5/2003 | Higashi et al. | 428/1.31 |
| 2004/0041965 A1 * | 3/2004 | Liu | 349/113 |
| 2004/0061963 A1 | 4/2004 | Inaba | |
| 2005/0024754 A1 | 2/2005 | Epstein | |
| 2010/0156953 A1 | 6/2010 | Nevitt | |
| 2012/0039084 A1 | 2/2012 | Eckhardt | |

FOREIGN PATENT DOCUMENTS

| | | |
|---|---|---|
| JP | S59-132501 | 7/1984 |
| JP | 8-235904 | 9/1996 |
| JP | H10-106310 | 4/1998 |
| JP | H11-066907 | 3/1999 |
| JP | 2000-067611 | 3/2000 |
| JP | 2005-055829 | 3/2005 |
| JP | 2008-027857 | 2/2008 |
| WO | 00-42454 | 7/2000 |
| WO | WO 2008-144644 | 11/2008 |
| WO | WO 2008-144656 | 11/2008 |

* cited by examiner

TRANSFLECTIVE ARTICLES AND LIGHT ASSEMBLIES

CROSS REFERENCE TO RELATED APPLICATIONS

This application is a national stage filing under 35 U.S.C. 371 of PCT/US2010/060233, filed Dec. 14, 2010, which claims priority to U.S. Provisional Application No. 61/288,596, filed Dec. 21, 2009, the disclosures of which are incorporated by reference in their entireties herein.

BACKGROUND

Light source applications are well known in the art and include those that are configured so that light is emitted relatively uniformly over a given area in a desired direction. The degree of uniformity and the degree of aiming are dictated by the specific application, but the emitting area is generally comparable to the device that is being illuminated.

Common applications for lighting include backlights for displays and signs as well as vehicular lights. A liquid crystal display (LCD) is commonly used in laptop computers, monitors and televisions. Because a liquid crystal produces no light of its own, but simply modulates light, it is common practice to provide directed area lighting, called a backlight, behind the LCD. This backlight is roughly the same size as the LCD and provides a beam that is directed through the LCD toward the viewer. One type of backlight commonly comprises at least one fluorescent lamp illuminating the edges of a plastic light guide. Light is extracted from the light guide via light extraction features on the surface of the light guide (e.g., bumps, pits, and paint dots).

Illuminated signs, of the type that comprise an internal light source and a translucent outer cover with text and/or graphics formed on it, are another application of directed area lighting. One common internal light source for this application is a row of fluorescent bulbs, with the uniformity requirements being met by placing diffuser plates between the bulbs and the outer cover.

Vehicular lights (e.g., headlights and taillights) are also examples of directed area lighting. For example, SAE J586 JUL2007, Section 6.4.2, published July, 2007, calls out a minimum lighted area of 50 cm$^2$ for brake lights, and gives details on how this is to be interpreted. In addition, FIGS. 3 to 5 and the associated text in Section 5.1.5 specify the minimum and maximum intensity that needs to be emitted in certain directions.

Several types of suitable light sources are available, and include incandescent bulbs, fluorescent tubes, discharge lamps, and light emitting diodes (LEDs). Recent developments in LED technology have made them among the most efficient.

SUMMARY

In one aspect, the present disclosure describes a transflective article comprising:
a first layer having a major surface having a plurality of apertures therein; and
a second layer having a major transflective surface.
Optionally, the transflective article further comprises a third layer having a major surface having at least one visible light absorbing area (in some embodiments, a plurality of visible light absorbing areas).

In some embodiments, the first and second layers are integral. In some embodiments, at least a portion of the transflective surface is curved. In some embodiments, the major transflective surface faces away from the apertures, whereas in other embodiments, the major transflective surface faces toward the apertures. Typically, the transflective surface faces the visible light absorbing area(s) of the third layer. In some embodiments, the first, second, and third layers are in that order, while in others, for example, the third layer is between the first and second layers. In some embodiments, the major transflective surface comprises microstructures.

"Curved surface" as used herein refers to a surface that departs from planar by at least 2% (in some embodiments, at least 3%, 4%, or even at least 5%) of the longest dimension of the surface (i.e., the percent ratio of the maximum distance of a tangent plane (as measured by the tangent normal) from any point on the surface to the longest dimension of the surface is at least 2% (in some embodiments, at least 3%, 4%, or even at least 5%)).

Transflective articles described herein are useful, for example, in light assemblies (i.e., light assembly comprising a light source and a transflective article described herein).

In certain lighting applications, specific performance criteria are desired or required to be met while also offering style and design features to differentiate the product in the market. Automotive lighting is one such application. Advantages of embodiments of transflective articles described herein can be designed to both modulate the light intensity and uniformity (to meet performance requirements) and to introduce design elements that are highlighted by the lighting itself.

DETAILED DESCRIPTION

Figure 1:
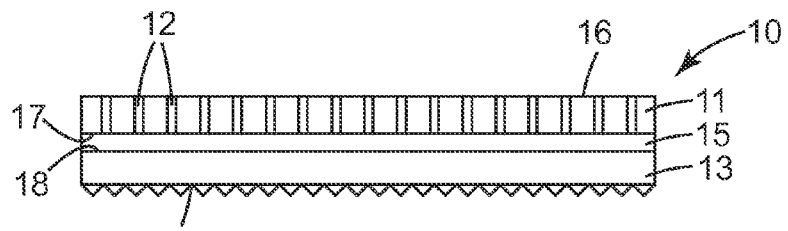
FIG. 1 is a cross-sectional view of an exemplary transflective article described herein.

Referring to FIG. 1, exemplary transflective article according to the present disclosure 10 has first layer 11 with major surfaces 16, 17 having plurality of apertures 12 therein, second layer 13 with major surfaces 18, 19, and optional adhesive 15. Major surface 19 is transflective.

Figure 1A:
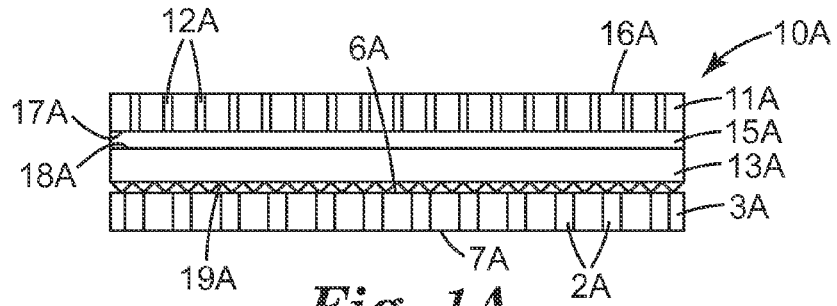
FIG. 1A is a cross-sectional view of another exemplary transflective article described herein.

Referring to FIG. 1A, exemplary transflective article according to the present disclosure 10A has first layer 11A with major surfaces 16A, 17A having plurality of apertures 12A therein, second layer 13A with major surfaces 18A, 19A, third layer 3A with major surfaces 6A, 7A having plurality of apertures 2A therein, and optional adhesive 15A. Major surface 19A is transflective.

Figure 2:
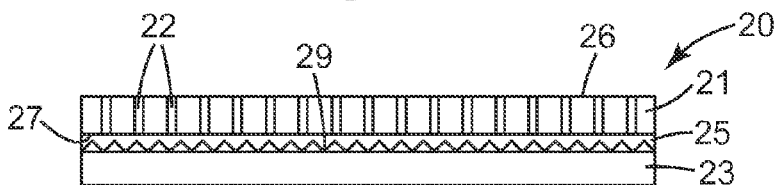
FIG. 2 is a cross-sectional view of another exemplary transflective article described herein.

Referring to FIG. 2, exemplary transflective article according to the present disclosure 20 has first layer 21 with major surfaces 26, 27 having plurality of apertures 22 therein, second layer 23 with major surfaces 28, 29, and optional adhesive 25. Major surface 29 is transflective.

Figure 2A:
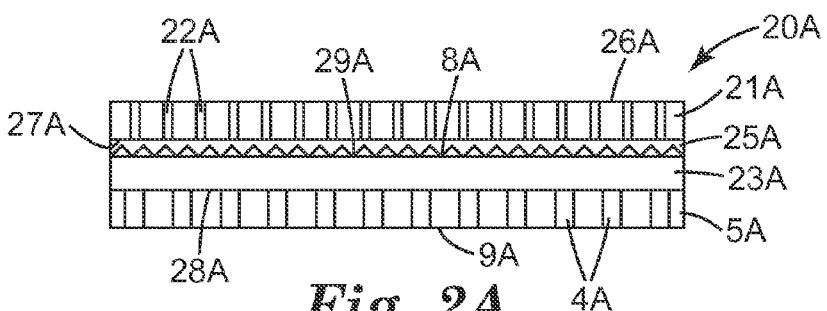
FIG. 2A is a cross-sectional view of another exemplary transflective article described herein.

Referring to FIG. 2A, exemplary transflective article according to the present disclosure 20A has first layer 21A with major surfaces 26A, 27A having plurality of apertures 22A therein, second layer 23A with major surfaces 28A, 29A, third layer 5A with major surfaces 8A, 9A having plurality of apertures 4A, and optional adhesive 25A. Major surface 29A is transflective "Transflective" as used herein means partly reflecting and partly transmitting, although there may also be some absorption (e.g., less than 5% at the operating wavelength of a light assembly). The operating wavelengths are those at which a device is designed to operate. For example, an automobile tail light is designed to be red, so its operating wavelengths are generally greater than 610 nm. Absorption at shorter wavelengths is not within the operating spectrum. Another example would be a sign with a multicolored image on it. Such a sign would generally need to be illuminated with white light so that all of the colors in the image would be illuminated, so absorption should be less than 5% across the visible spectrum. It is understood that in some embodiments a dye or other visible light absorber may be added to a transflective component that increases its absorption to greater than 5% to produce (e.g., a particular color or degree of transmittance), although the transflective function remains.

Additionally, it is recognized that all transparent materials reflect some light, as given by the Fresnel equations, so transflective is further understood to have reflectivity greater than that dictated by the Fresnel equations at normal incidence, which is given by $$R = \frac{(n-1)^2}{(n+1)^2},$$

where R is the reflectance at normal incidence and n is the refractive index of the material.

Typically, transflective surfaces are smooth partial reflectors or structured surfaces (e.g., microstructures). However, in some embodiments, the transflective surface may have a textured surface(s), or at least a portion may have textured surface(s). The texturing may be random, or have a regular symmetric orientation (e.g., a repeating pattern). Typically, the texturing facilitates homogeneous, uniform lighting or otherwise provides light dispersion effect(s). Transflective surfaces can be provided, for example, as separate piece (e.g., a piece of plastic or the like) or a film. The transflective surfaces can also be provided, for example, by any of a number of techniques, including molding, sand blasting, bead blasting, chemical etching, embossing, and laser ablating, as well as other forming techniques that may be apparent to one skilled in the art after reading the instant disclosure.

In some embodiments of transflective articles described herein, at least a portion of the major transflective surface is curved. "Curved surface" as used herein refers to a surface that departs from planarity by at least 2% (in some embodiments, at least 3%, 4%, or even at least 5%) of the longest dimension of the surface (i.e., the percent ratio of the maximum distance of a tangent plane (as measured by the tangent normal) from any point on the surface to the longest dimension on the surface is at least 2% (in some embodiments, at least 3%, 4%, or even at least 5%)).

In some embodiments of transflective articles described herein, the transflective surface includes a first region with a first group of structures and a second region with a second, different group of structures.

In some embodiments of transflective articles described herein, the transflective surface comprises first and second areas of transflectivity, wherein the first area of transflectivity is more transflective with respect to a first wavelength of light than the second area of transflectivity, and wherein the second area of transflectivity is more transflective with respect to a second, different wavelength of light than the first area of transflectivity.

In some embodiments of transflective articles described herein, the first layer is made of a material that is optically transparent (i.e., greater than about 80% transmittance) to visible light, while in other exemplary embodiments, the first layer is made of a material that is opaque (i.e., less than about 10% transmittance) to visible light. Suitable transparent materials include polycarbonate, acrylates, methacrylates, and polyesters. Suitable opaque materials include olefins and pigmented polymers (e.g., pigmented polycarbonate, acrylates methacrylates, and polyesters).

The optional third layer having at least one visible light absorbing area is typically used for aesthetic effect. In some embodiments, the third layer has a plurality of visible light absorbing areas. The degree of visible light absorption can vary, and in some embodiments at least a portion of the visible light absorbing area(s) block all incoming light. The visible light absorbing areas can form a regular pattern and/or have a gradient pattern. The visible light absorbing area(s) can be in any of a variety of desired sizes, shapes (e.g., circular, elliptical, solid line, triangular, square, rectangular, hexagonal, or other polygons, sinusoidal, irregular, zig zag, etc.), etc, including an alphanumeric(s) and/or trademark indicia, and may have an aperture(s) adjacent thereto. The visible light absorbing areas can be provided, for example, using techniques known in the art such as printing, lithography to make a tool which in turn is used in polymer extrusion replication or embossing. Apertures can be provided, for example, via lamination of perforated films. Apertures can also be provided by printing.

In some embodiments of transflective articles described herein, the apertures have a regular pattern and/or have a gradient pattern. Exemplary apertures have at least one of the following shapes: circular, elliptical, solid line, triangular, square, rectangular, hexagonal, or other polygons. Sinusoidal, irregular, zig zag, decorative, shapes can also be used. The apertures can be symmetric or non-symmetric. The apertures can have the shape of an alphanumeric(s) and/or trademark indicia. In some embodiments, the apertures comprise at least 50 (in some embodiments, at least 55, 60, 65, 70, or even at least 75; in some embodiments, in a range from, for example, 50 to 80, 60 to 80, 65 to 80, or 60 to 75) percent by area of the first major surface of the first layer. In some embodiments, for the apertures of the first layer a largest dimension in a range from 0.5 mm to 25 mm. In some embodiments, for the apertures of the third layer a largest dimension in a range from 5 mm to 300 mm. Apertures can be provided, for example, using techniques known in the art such as lithography to make a tool which in turn is used in polymer extrusion replication or embossing. Apertures can be provided, for example, via lamination of perforated films.

In some embodiments of transflective articles described herein, the first and second layers are integral, and can be provided, for example, using techniques known in the art such as lithography to make a tool which in turn is used in polymer extrusion replication or embossing. While in other exemplary embodiments, for example, the first and second layers are secured together at least in part via a pressure sensitive adhesive (including a repositionable pressure sensitive adhesive) and/or a permanent adhesive. In some embodiments, the first and second layers are heat laminated together.

In some embodiments of transflective articles described herein, the first layer has indicia (e.g., alphanumerics) printing on a major surface thereof. The indicia, for example, may be printed.

Structured transflective surfaces have a plurality of minute structures arranged to reflect a substantial portion of the incident light and transmit a substantial portion. The reflectivity of the surface is changed primarily by this change in the local geometry. Useful structures include linear prisms, pyramidal prisms with triangular, square, hexagonal or other polygonal bases, cones, and ellipsoids, which structures may be in the form of projections extending out from a surface or pits extending into the surface. The size, shape, geometry, orientation, and spacing of the structures, as well as the use of multiple, different structures (e.g., different sizes, shapes, geometries, orientations, etc.), and density of spacing can all be selected to optimize the performance of the light assembly or otherwise provide a desired effect. The individual structures can be symmetric and/or asymmetric. The structured surface can be uniform and/or non-uniform, and in the latter case both the position and size of the structures can be random or pseudo-random. In this context, "uniform" is understood to mean that the structured surface includes a repeating structural pattern. Disrupting regular features by periodic or pseudo-random variation of size, shape, geometry, orientation, and/or spacing may be used to adjust the color and/or brightness uniformity of the light assembly. In some cases it may be beneficial to have a distribution of small and large structures and position the transflective surface such that the smaller structures are aligned generally over the light sources and the larger structures are positioned elsewhere. In some embodiments, the structures can be closely packed such that there is minimal land (including arrangements in which there is substantially no land) between structures. In some embodiments, it may be desirable to control the land area to modulate the amount of light passing through the transflective surface.

The height to base length ratio of the structures is of some importance to the performance of the transflective article. A structure's base is the surface that would exist if none of the added shapes were present, and its base length is the greatest dimension from any point on the perimeter of the base to any other. Height is understood to mean the distance from the base of the structure to the point most distant from the base.

In a preferred embodiment, the structures are about 0.25 mm high, and about 30% of the transflective area is flat.

Typically, the structures range in height from about from 0.01 mm to 3 mm (in some embodiments, about 0.05 mm to about 0.5 mm), although other sizes are also useful.

In some embodiments, the transflective surface has a structure comprised of a plurality of shapes having a height to base length ratio greater than 0.1:1, 0.1:2, 0.1:3, or even 0.4:1.

Examples of suitable structured transflective surfaces include commercial one-dimensional (linear) prismatic polymeric films such as available from 3M Company, St. Paul, Minn., under the trade designations "VIKUITI BRIGHTNESS ENHANCEMENT FILM," "VIKUITI TRANSMISSIVE RIGHT ANGLE FILM," VIKUITI IMAGE DIRECTING FILM," and "VIKUITI OPTICAL LIGHTING FILM," as well as conventional lenticular linear lens arrays. When these one-dimensional prismatic films are used as transflective surfaces in a light assembly described herein, it is typically desirable for the prismatic structured surface to face the light source.

Additional examples of suitable structured transflective surfaces, where the structured surface has a two-dimensional character, include cube corner surface configurations such as those reported in U.S. Pat. No. 4,588,258 (Hoopman), U.S. Pat. No. 4,775,219 (Appeldorn et al.), U.S. Pat. No. 5,138, 488 (Szczech), U.S. Pat. No. 5,122,902 (Benson), U.S. Pat. No. 5,450,285 (Smith et al.), and U.S. Pat. No. 5,840,405 (Shusta et al.); inverted prism surface configurations such as reported in U.S. Pat. No. 6,287,670 (Benson et al.) and U.S. Pat. No. 6,280,822 (Smith et al.); structured surface films such as reported in U.S. Pat. No. 6,752,505 (Parker et al.) and U.S. Pat. Publication No. 2005/0024754 (Epstein et al.); and beaded sheeting such as that reported in U.S. Pat. No. 6,771,335 (Kimura et al.), the disclosures of which are incorporated herein by reference.

In some embodiments, the transflective surface is at least partially (e.g., at least 10%, 15%, 20%, 25%, 30%, 35%, 40%, 45%, 50%, 55%, 60%, 65%, 70%, 75%, 80%, 85%, 90%, 95%, 97%, 98%, 99%, or even 100%) reflective. The reflectance may be semi-specular. A "semi-specular" reflector provides a balance of specular and diffusive properties. Semi-specular reflective surfaces can be provided, for example, by (1) a partial transmitting specular reflector plus a high reflectance diffuse reflector; (2) a partial Lambertian diffuser covering a high reflectance specular reflector; (3) a forward scattering diffuser plus a high reflectance specular reflector; or (4) a corrugated high reflectance specular reflector. Additional details regarding semi-specular reflective materials can be found, for example, in PCT Application No. US2008/864115, the disclosure of which is incorporated herein by reference.

In some embodiments, it may be desirable for the transflective surface to also be retroreflective. This is understood to mean that, in addition to transmitting and reflecting light within the optical cavity, the transflective also reflects a substantial portion of light incident on it from outside the outer lens cover back in the general direction of the source of that light. Traditionally, this is done by using cube corners (tetrahedra with three right angles) for the shape of the microstructures. In some embodiments where high retroreflectivity is not desired, reduced retroreflectivity may be achieved by using cube corners with spaces between them, or between groups of them, or by modifying the angles to differ from 90°. Partial retroreflectivity can range from returning 10% of the incident light to, for example, 20%, 30%, 40%, 50%, 60%, 70%, 80%, or even at least 90%. Partial retroreflectivity can also be induced, for example, by physical openings in the retroreflective surface (e.g., holes, slots, perforations, etc.) or by otherwise destroying the retroreflective functionality (e.g., such as by filling the retroreflective structured surface with coatings or adhesive). A spatially variant structure could also be used. "Spatially variant structure" means that the size, spacing, shape or some other parameter of the structures is varied across the surface.

Transflective articles described herein are useful, for example, in light assemblies (i.e., light assembly comprising a light source and a transflective article described herein). In some embodiments, the transflective surface faces toward the light source, while in others it faces away. In some embodiments, the plurality of apertures is closer to the light source than is the transflective surface, while in others the transflective surface is closer to the light source than is the plurality of apertures. In some exemplary embodiments, the light assembly further comprises a reflector having an inner major surface.

Figure 3:
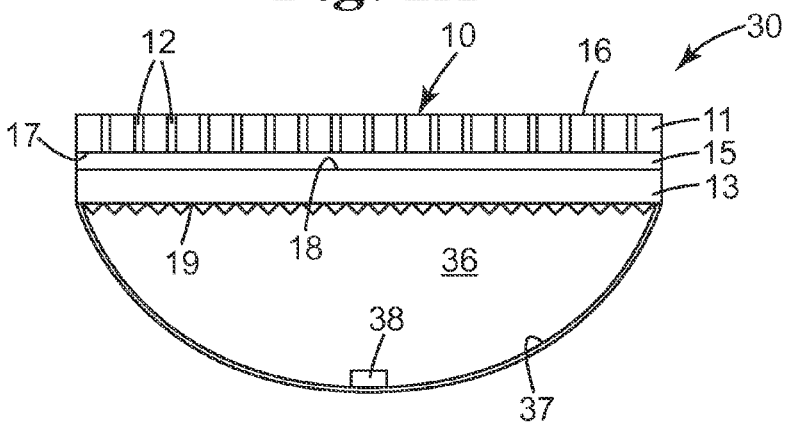
FIGS. 3-6, 7A, and 8-11 are a cross-sectional view of various exemplary light assemblies having various exemplary transflective articles described herein.

For example, referring to FIG. 3, exemplary light assembly 30 has optical cavity 36, reflector 37, light source 38, and transflective article 10 (see FIG. 1) with transflective surface 19 facing towards light source 38.

Figure 4:
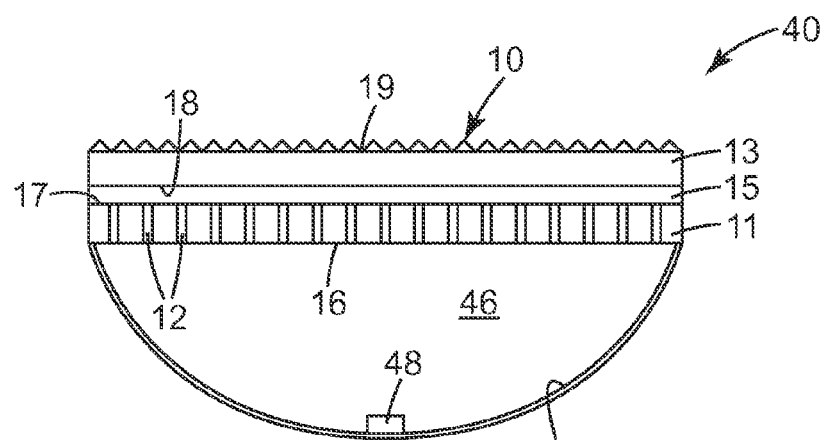

Referring to FIG. 4, exemplary light assembly 40 has optical cavity 46, reflector 47, light source 48, and transflective article 10 (see FIG. 1) with transflective surface 19 facing away from light source 48.

Figure 5:
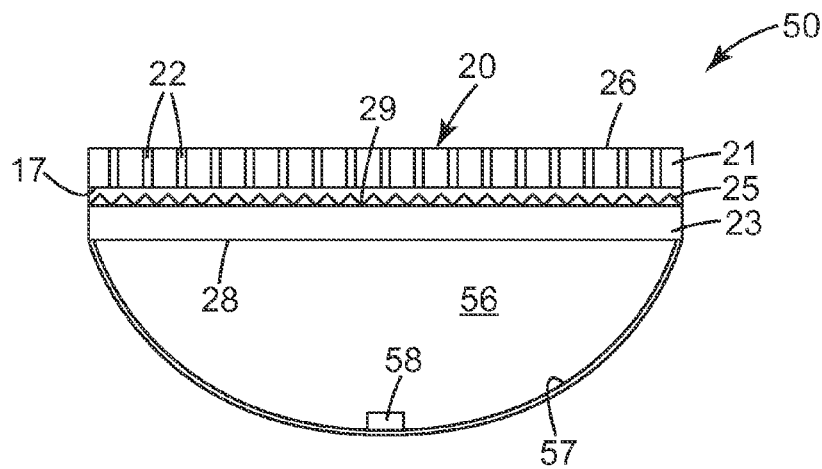

Referring to FIG. 5, exemplary light assembly 50 has optical cavity 56, reflector 57, light source 58, and transflective article 20 (see FIG. 2) with transflective surface 29 facing away from light source 58.

Figure 6:
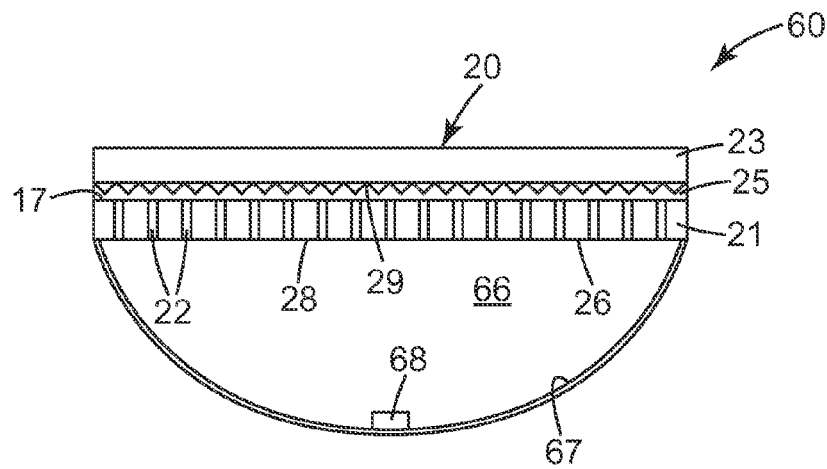

Referring to FIG. 6, exemplary light assembly 60 has optical cavity 66, reflector 67, light source 68, and transflective article 20 (see FIG. 2) with transflective surface 29 facing towards light source 68.

Some embodiments further comprise an outer light cover having an outer major surface, wherein the transflective article is disposed between the outer major surface of the outer light cover and the inner major surface of the reflector. In some embodiments, there is an optical cavity between the transflective article and the reflector, wherein the first light source is positioned to introduce light into the optical cavity.

Embodiments of light assemblies described herein are useful, for example, as signs, backlights, displays, task lighting, luminaire, vehicle (e.g., cars, trucks, airplanes, etc.) components. Vehicle comprising light assemblies include those where the light assembly is a vehicle tail light assembly.

Figure 7:
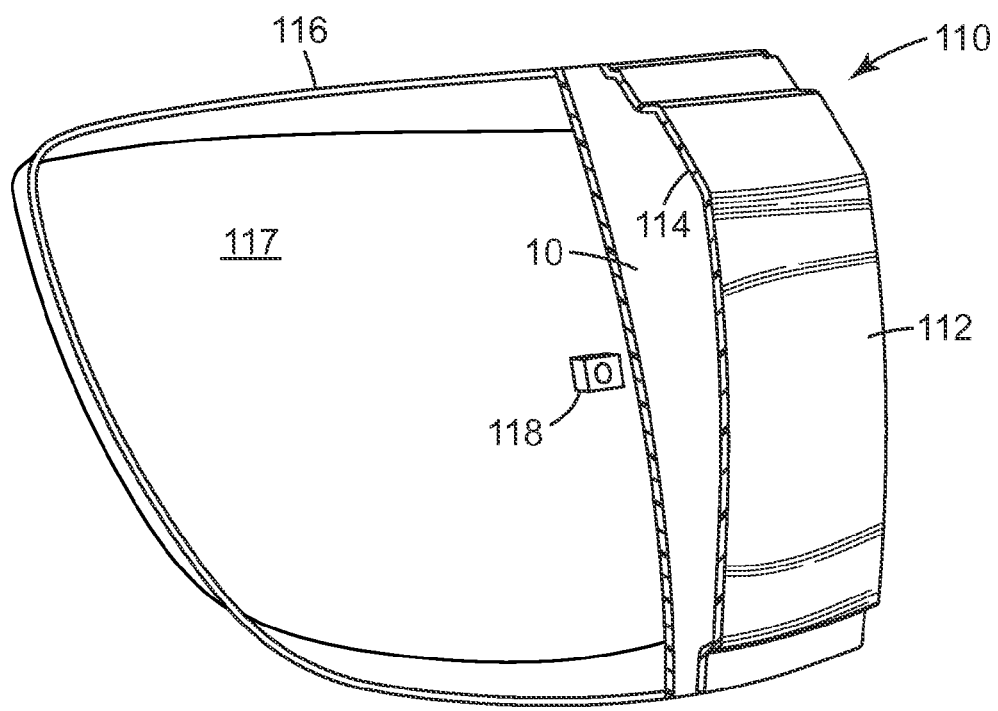
FIG. 7 is a perspective cross-sectional view of the light assembly shown in FIG. 7A.
Figure 7A:
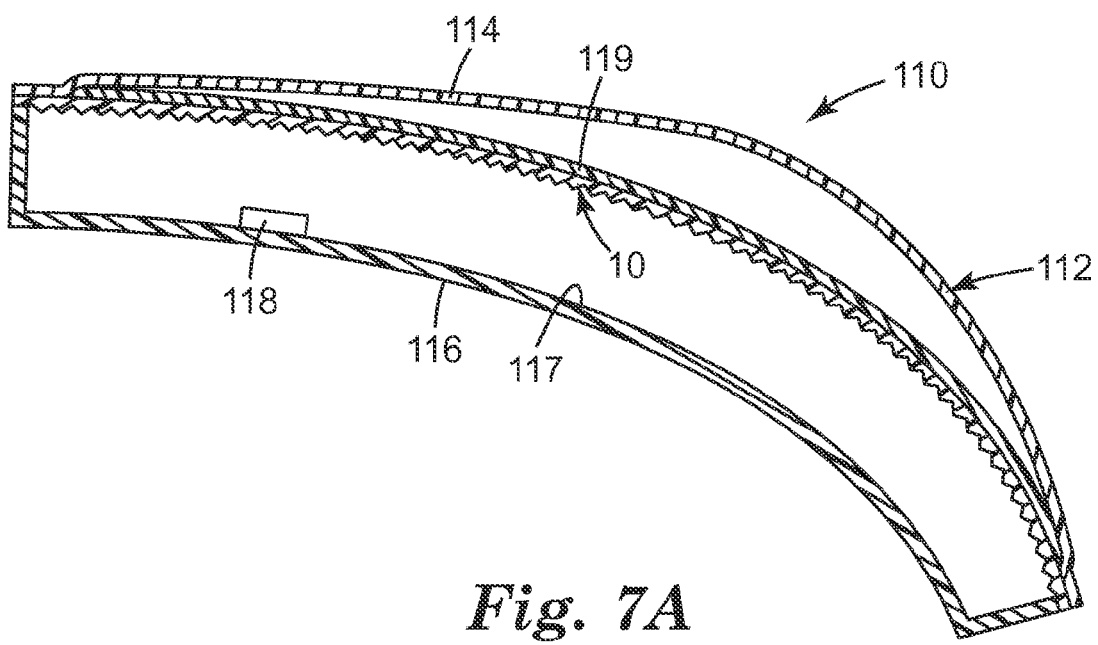

For example, referring to FIGS. 7 and 7A, exemplary automobile tail light assembly 110 has curved outer light cover 112, reflector 116 having inner major surface 117, and light emitting diode 118. Outer light cover 112 is made up of two pieces 10 (see FIG. 1 for further details) and 114. Optionally, automobile tail light assembly 110 includes diffuser 119.

Figure 8:
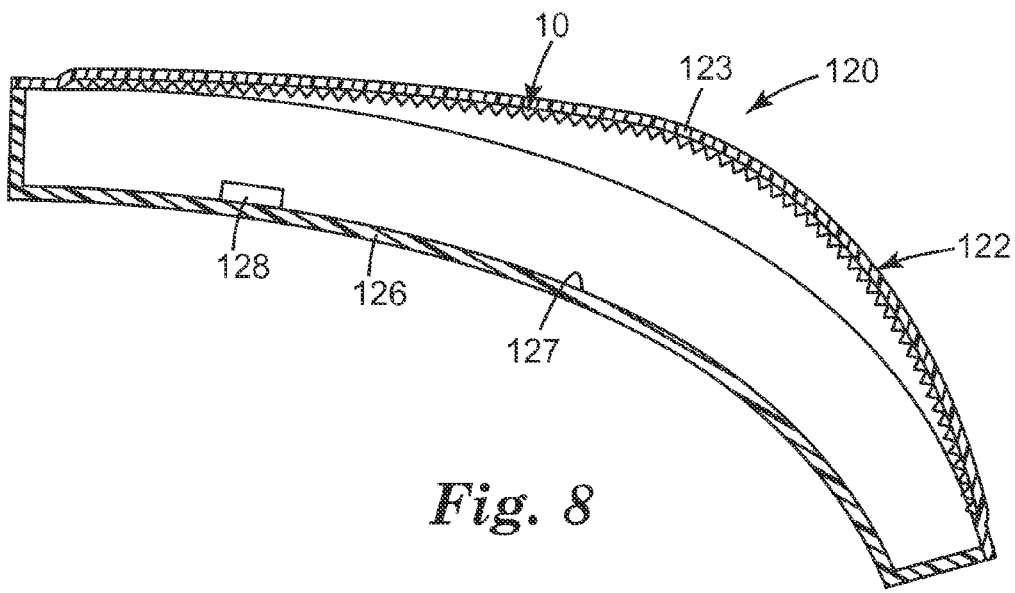

Referring to FIG. 8, exemplary light assembly 120 has curved outer light cover 122, reflector 126 having inner major surface 127, and light emitting diode 128. Transflective article 10 (see FIG. 1 for further details) is attached to inner major surface 123 of outer light cover 122.

Figure 8A:
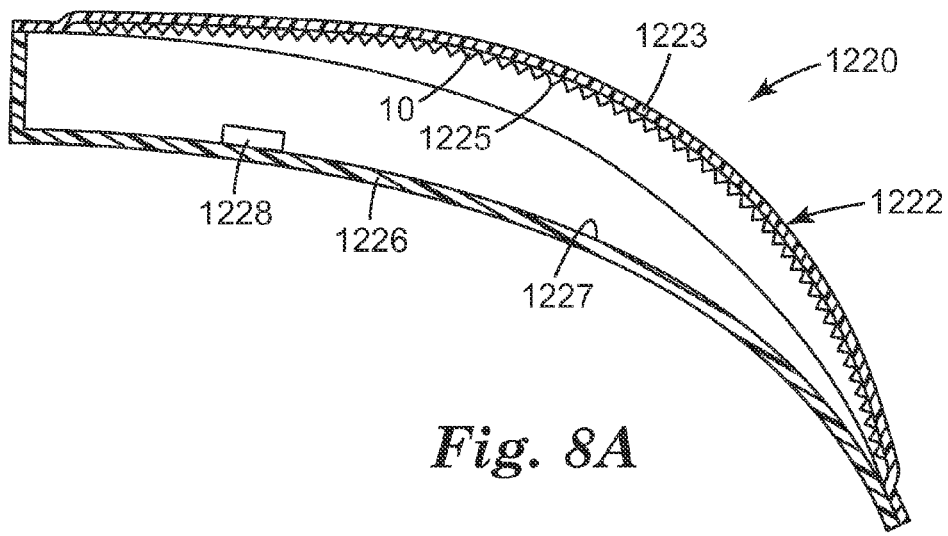

Referring to FIG. 8A, exemplary light assembly 1220 has curved outer light cover 1222, reflector 1226 having inner major surface 1227, and light emitting diode 1228. Transflective article 10 (see FIG. 1 for further details) to inner major surface 1223 of outer light cover 1222.

Figure 9:
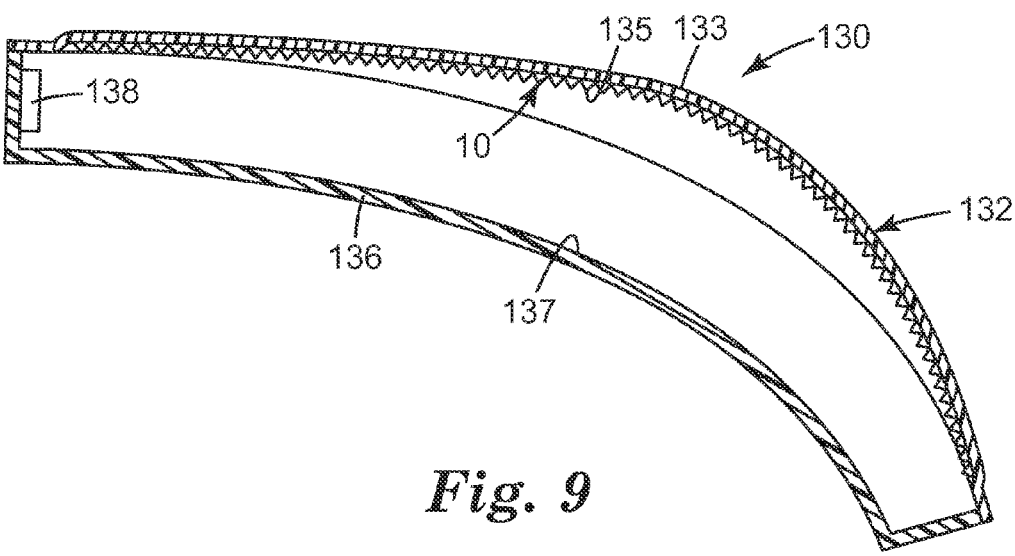

Referring to FIG. 9, exemplary light assembly 130 has curved outer light cover 132, reflector 136 having inner major surface 137, and light emitting diode 138. Transflective article 10 (see FIG. 1 for further details) is attached to inner major surface 133 of outer light cover 132.

Figure 10:
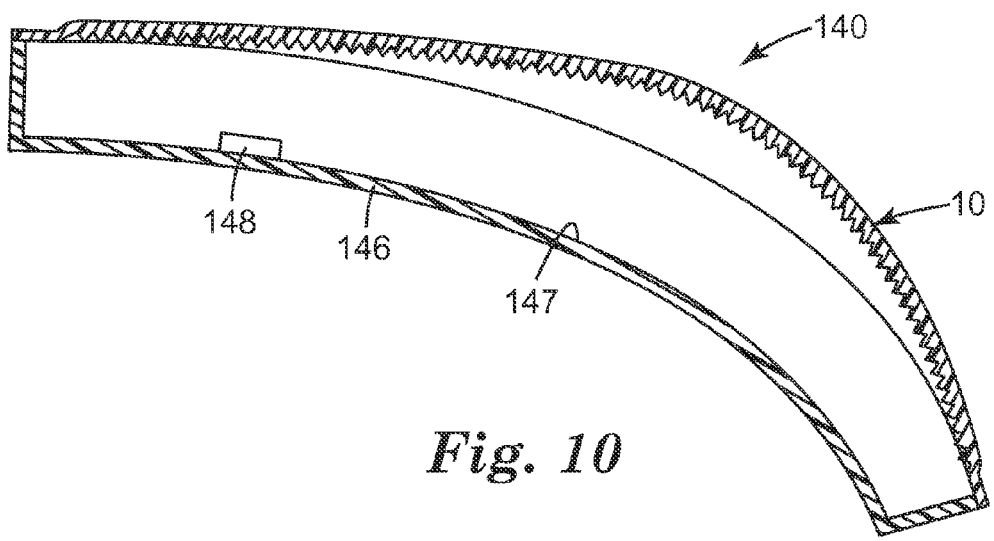

Referring to FIG. 10 exemplary light assembly 140 has transflective article 10 (see FIG. 1 for further details) (which is a curved outer light cover) having inner, molded transflective major surface (19), reflector 146 having inner major surface 147, and light emitting diode 148.

Figure 12:
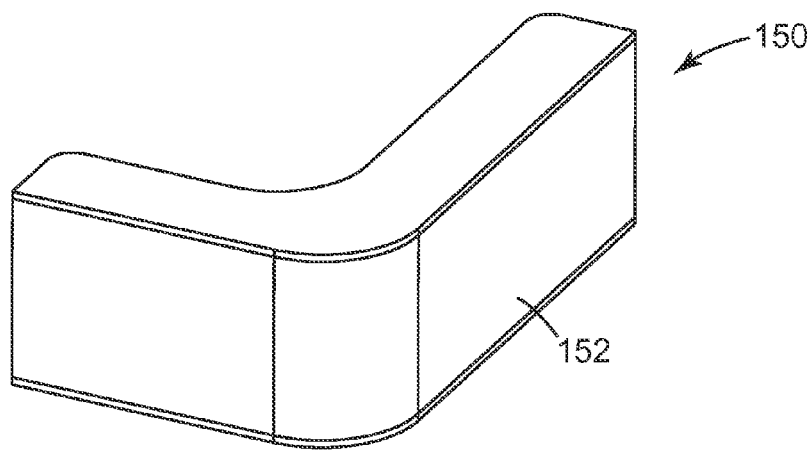
FIGS. 12 and 13 are perspective views of exemplary shapes of light assemblies of the present disclosure.
Figure 13:
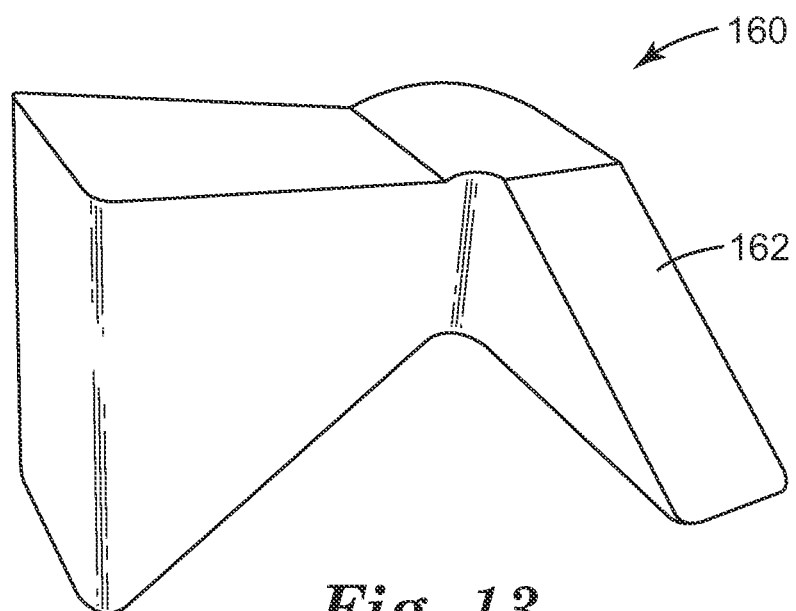

Other exemplary shapes of light assemblies are shown in FIGS. 12 and 13. Each exemplary light assembly 150, 160 has an outer light cover 152, 162, respectively.

In some embodiments, the inner major surface of the reflector is oriented to the transflective surface so that the separation between the two surfaces decreases along a distance away from the light source, and wherein the maximum local ratio of decrease in separation to distance is less than 0.8:1 (in some embodiments, less than 0.7:1, 0.6:1, 0.5:1, 0.4:1, 0.35:1 0.3:1, 0.25:1, 0.2:1, 0.15:1, 0.1:1, or even less than 0.05:1). In some embodiments, at least a portion of the outer light cover and/or the transflective surface are curved.

Figure 14:
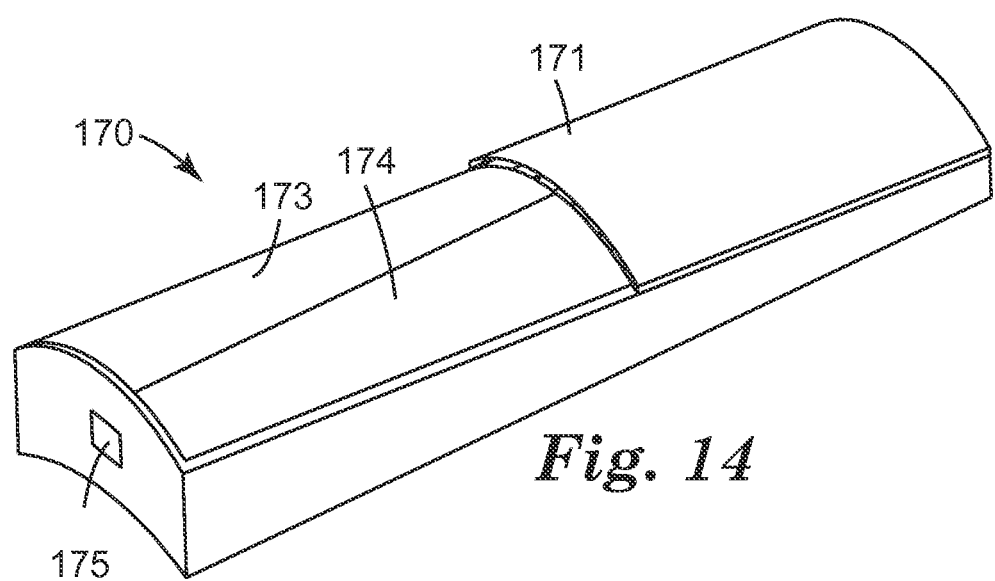
FIG. 14 is perspective view of another exemplary light assembly having an exemplary transflective article described herein.

For example, referring to FIG. 14, exemplary light assembly 170 has outer light cover 171, reflector 173, light source 175, and shows the decrease in separation between outer light cover 171 and inner major surface 174 of reflector 173.

In some embodiments, the light assembly comprises:
an outer light cover having a first and second generally opposed major surfaces, and a first zone having a first color, and a second zone having a second, at least one of different color or being clear, the second major surface being an inner major surface;
a reflector having an inner major surface that is parallel to at least 30 (40, 50, 60, 70, 80, or even at least 90) percent of the inner major surface of the outer light cover;
a transflective article described herein disposed between the outer light cover and the reflector, the inner lens having first and second generally opposed major surfaces; and
a first light source that emits a first color when energized; wherein there is an optical cavity between inner major surface of the transflective surface and the inner major surface of the reflector, and wherein the first light source is selected and positioned to introduce light into the optical cavity such that, when energized, provides the same color for the first and second zones when viewed from the first major surface of the outer cover (as determined by the "Color Test" as described herein). In some embodiments, the outer light cover is curved. Typically, the curved, transflective major surface is generally convex relative to the reflector.

In one exemplary embodiment, the first color of the first zone is red and the first color of the first light source is red. In a further exemplary embodiment, the second color of the second zone is white or clear. In a further exemplary embodiment, the lighting assembly further comprises a second light source that emits a second color (e.g., white) when energized, different than the first color of the first light source (as determined by the "Color Test" as described herein), wherein the second light source is selected and positioned to introduce light into the optical cavity such that, when energized, provides the same color for the first zone, and optionally, provides the second color for the second zone, when viewed from the first major surface of the outer cover (as determined by the "Color Test" as described herein). In a further exemplary embodiment, the lighting assembly further comprises a third light source that emits a color that is the same as the first light source when energized (as determined by the "Color Test"), but brighter, when energized, wherein the third light source is selected and positioned to introduce light into the optical cavity such that, when energized, provides a light intensity brighter than the intensity of the first light source when viewed from the first major surface of the outer cover. In a further exemplary embodiment, the lighting assembly further comprises a fourth light source that emits a fourth color (e.g., amber) when energized, different than the first color of the first light source (as determined by the "Color Test" as described herein), the second color of the second light source, if present, and the third color of the third light source, if present, wherein the fourth light source is selected and positioned to introduce light into the optical cavity such that, when energized, provides a color different from the first color of first light source (as determined by the "Color Test" as described herein), the second color of second light source, if present, and the third color of the third light source, if present, when viewed from the first major surface of the outer cover. In some embodiments, the first light source, the second light source, the third light source, if present, and fourth light source, if present, are within a single optical cavity. In some embodiments there are no more than two different light source colors within a single light cavity.

The "Color Test" was SAE Standard J578 (June 1995) "Color Specification for Electrical Signal Lighting Devices", the disclosure of which is incorporated herein by reference. Section 3 of this standard sets forth the definitions of various colors via light emission boundaries as per x and y values on a Chromaticity Diagram. Following Section 4.1.2 of this standard, a spectrophotometric method was used with a spectroradiometer (obtained under the trade designation "PR-705 SPECTRASCAN SYSTEM" from Photo Research Inc., Chatsworth, Calif.) having a cosine correcting lens, in combination with a 5-axis gonimetric motion control system (obtained under the trade designation "WESTAR FPM 520" from Westar Display Technologies, Inc., Saint Charles, Mo.).

Figure 15:
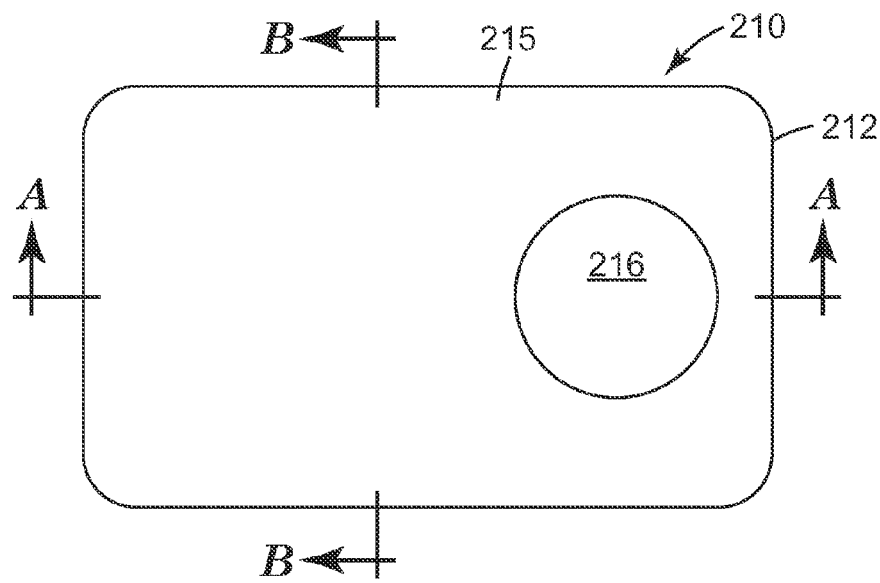
FIGS. 15, 15A (viewed along line AA of FIG. 15), and 15B (viewed along line BB of FIG. 15) are end and cross-sectional side views of an exemplary light assembly having an exemplary transflective article described herein.
Figure 15A:
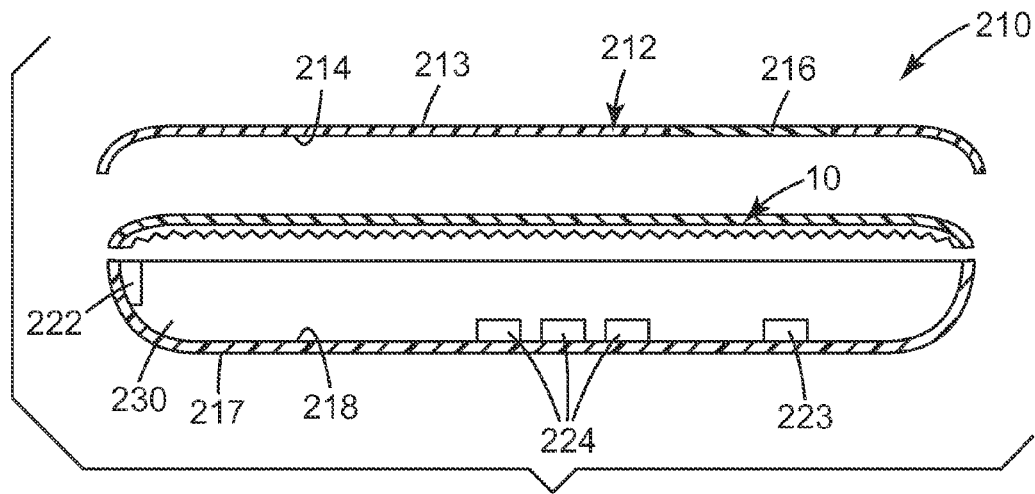
Figure 15B:
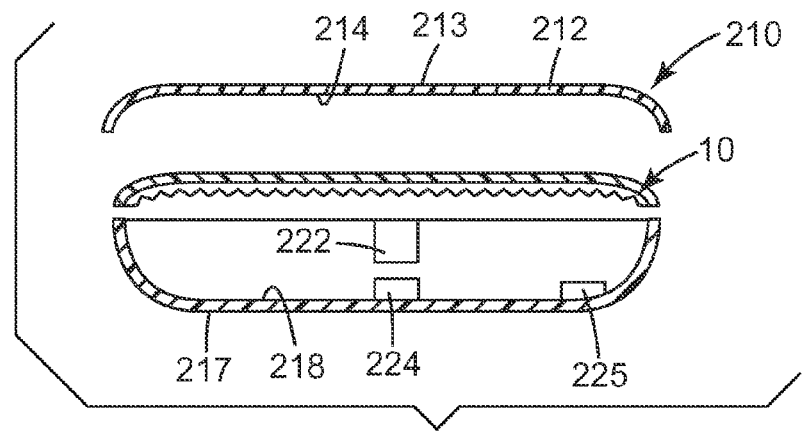

For example, referring to FIGS. 15, 15A, and 15B, exemplary automobile tail light assembly 210 has (optional curved) outer light cover 212 with first and second generally opposed major surfaces 213, 214, and first zone 215 having a first color (e.g., red), and second zone 216 having second, different color (e.g., clear or white). Automobile tail light assembly 210 further includes reflector 217 having inner major surface 218; transflective article 10 (see FIG. 1 for more details) (which serves as an inner lens) disposed between outer light cover 212 and reflector 217, wherein transflective article 10; and first light source 222 that emits a first color (e.g., red) when energized. There is an optical cavity 230 between inner lens major surface 221 and reflector major surface 218. First light source 222 (e.g., red; e.g., for running light and/or parking light function) is selected and positioned to introduce light into optical cavity 230 such that, when energized, provides the same color for first and second zones 215, 216 when viewed from first major surface 213. In some embodiments, the outer light cover is curved.

Optionally, light assembly 210 includes second light source 223 that emits second color (e.g., white; e.g., for backup function) when energized, different than the first color of first light source 222, wherein second light source 223 is selected and positioned to introduce light into optical cavity 230 such that, when energized, provides the same color for second zone 216 when viewed from first major surface 213.

Optionally, light assembly 210 includes third light source 224 that emits a color the same as first light source when energized, but brighter, when energized, wherein third light source 224 is selected and positioned to introduce light into the optical cavity such that, when energized, provides a light intensity brighter than the intensity of the first light source when viewed from first major surface 213 of outer cover 212.

Optionally, light assembly 210 includes fourth light source 225 that emits a fourth color (e.g., amber; e.g., for turn signal function) when energized, different than the first color of first light source 222, second color of second light source 223, if present, and the third color of third light source 224, if present, wherein fourth light source 225 is selected and positioned to introduce light into the optical cavity such that, when energized, provides a color different from the first color of first light source 222, second color of second light source 223, if present, and the third color of third light source, if present, when viewed from the first major surface of the outer cover.

Figure 16:
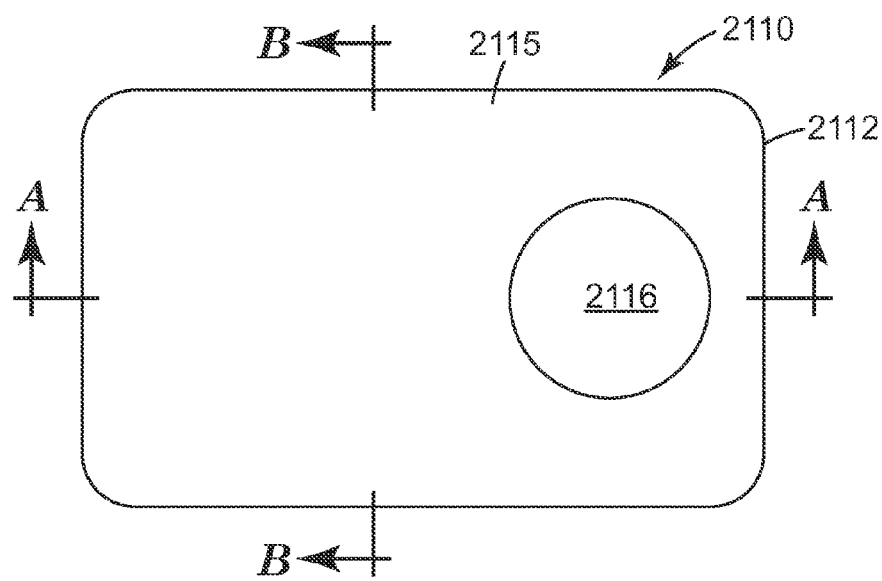
FIGS. 16, 16A (viewed along line AA of FIG. 16), and 16B (viewed along line BB of FIG. 16) are end and cross-sectional side views of another exemplary light assembly having an exemplary transflective article described herein.
Figure 16A:
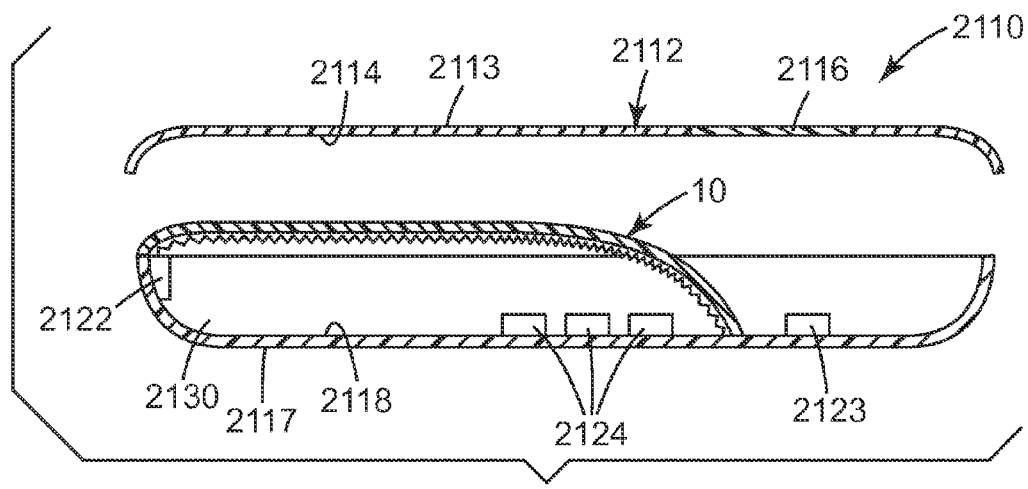
Figure 16B:
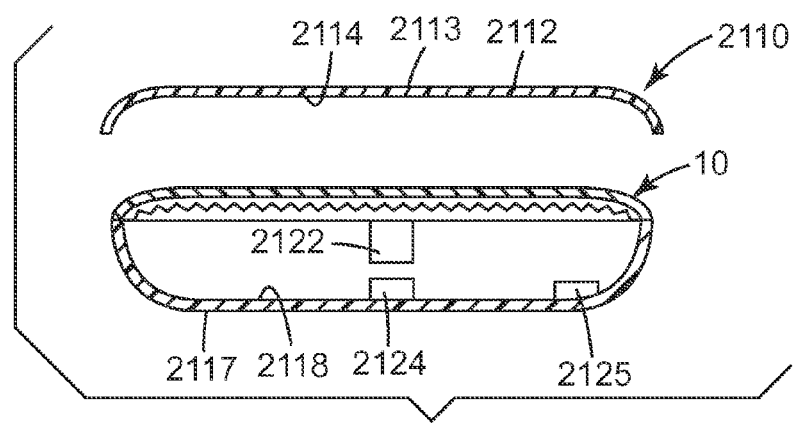

Referring to FIGS. 16, 16A, and 16B, an exemplary light assembly of the present disclosure is shown. Automobile tail light assembly 2110 has (optional curved) outer light cover 2112 with first and second generally opposed major surfaces 2113, 2114, and first zone 2115 having a first color (e.g., red), and second zone 2116 having second, different color (e.g., clear or white). Automobile tail light assembly 2110 further includes reflector 2117 having inner major surface 2118; transflective article 10 (see FIG. 1 for more details) (which serves as an inner lens) disposed between outer light cover 2112 and reflector 2117, wherein at least one of first or second major surfaces is transflective; and first light source 2122 that emits a first color (e.g., red) when energized. There is an optical cavity 2130 between inner lens major surface and reflector major surface 2118. First light source 2122 (e.g., red; e.g., for running light and/or parking light function) is selected and positioned to introduce light into optical cavity 2130 such that, when energized, provides the same color for first and second zones 2115, 2116 when viewed from first major surface 2113. In some embodiments, the outer light cover is curved.

Optionally, light assembly 2110 includes second light source 2123 that emits second color (e.g., white; e.g., for backup function) when energized, different than the first color of first light source 2122, wherein second light source 2123 is selected and positioned to introduce light into optical cavity 2130 such that, when energized, provides the same color for second zone 2116 when viewed from first major surface 2113.

Optionally, light assembly 2110 includes third light source 2124 that emits a color the same as first light source when energized, but brighter, when energized, wherein third light source 2124 is selected and positioned to introduce light into the optical cavity such that, when energized, provides a light intensity brighter than the intensity of the first light source when viewed from first major surface 2113 of outer cover 2112.

Optionally, light assembly 2110 includes fourth light source 2125 that emits a fourth color (e.g., amber; e.g., for turn signal function) when energized, different than the first color of first light source 2122, second color of second light source 2123, if present, and the third color of third light source 2124, if present, wherein fourth light source 2125 is selected and positioned to introduce light into the optical cavity such that, when energized, provides a color different from the first color of first light source 2122, second color of second light source 2123, if present, and the third color of third light source, if present, when viewed from the first major surface of the outer cover.

In some embodiments, light assemblies have a length to depth ratio greater than 1:1, 2:1, 3:1, 5:1, 10:1, 15:1, 20:1, 25:1, 50:1, 75:1, or even 80:1 The length to depth ratio of the light assembly is understood to be calculated from the length and depth of the light assembly. Length is determined by measuring the longest dimension of the outer cover. For instance, in FIG. 12, the longest dimension is found by measuring from one end of the outer cover around the bend to the other end. In FIG. 13, the longest dimension is from the base of the "7" to the top at either the right or left side, whichever is longer. Depth is determined by taking one or more cross-sections of the light assembly and measuring from the inner surface of the outer cover to the closest point on the inner surface of the reflector. The depth is the greatest such measurement. Further, for instance, in FIGS. 16, 16A, and 16B, the longest dimension is found by measuring from one end of the outer cover around the bends to the other end. Depth is determined by taking one or more cross-sections of the light assembly and measuring from the inner surface of the outer cover to the closest point on the inner surface of the reflector. The depth is the greatest such measurement.

Outer light covers are known in the art and typically comprise a plastic or other semi-transparent material which can be made, for example, by injection molding, thermoforming, etc., wherein semi-transparent means a majority of the light of the desired wavelengths is transmitted. For example, in a vehicular taillight a red plastic such as polymethylmethacrylate or polycarbonate is used to transmit the wavelengths specified by SAE J578 for such applications.

Particular applications may lend themselves to desired thicknesses and or shapes of the outer cover. Typically, the thickness of the rigid outer cover is in a range from about 0.5 mm to about 10 mm, although other thickness may also be useful. The shape of the outer cover may be in any of a variety of shapes, including those known in the art. The shape of the outer cover is typically chosen for aesthetic or functional reasons.

In some embodiments of light assemblies having reflector, the transflective surface is convex relative to the inner major surface of the reflector. In some embodiments of light assemblies described herein, a major surface of the reflector is substantially parallel to at least 30 (in some embodiments, at least 35, 40, 45, 50, 55, 60, 65, 70, 75, 80, 85, or even at least 90) percent by area of the transflective surface.

In some embodiments of light assemblies having a reflector and an outer light cover, the outer light cover further comprises an inner major surface, and at least 30 (in some embodiments, at least 35, 40, 45, 50, 55, 60, 65, 70, 75, 80, 85, or even at least 90) percent by area of the inner major surface of the outer light cover is the curved portion of the transflective surface (e.g., as shown 7A, 8, 8A, 9, 10, and 11).

Suitable reflectors are known in the art. The reflective nature of the reflector is, for example, an inherent property of a substrate material (e.g., polished aluminum), a coating (e.g., vapor coating) on a substrate material (e.g., silver or a multilayer optical coating), or a reflective film attached to the substrate. Typically, it is desirable for the reflector to have a highly reflective surface for enhanced light output efficiency for the light assembly. Typically, the reflectivity of the reflective surface of the reflector for visible light is at least 80% (in some embodiments, at least 85%, 90%, 91%, 92%, 93%, 94%, 95%, 96%, 97%, 98%, 99%, or more). The reflector can be a predominantly specular, diffuse, or combination specular/diffuse reflector, whether spatially uniform or patterned. In some embodiments, the reflector is at least partially (e.g., at least 10%, 15%, 20%, 25%, 30%, 35%, 40%, 45%, 50%, 55%, 60%, 65%, 70%, 75%, 80%, 85%, 90%, 95%, or even 100%) semi-specularly reflective. In some embodiments, the major surface of the reflector has a spectral reflectance of at least 90, 91, 92, 93, 94, 95, 96, 97, 98, or even at least 98.5) percent.

Suitable reflective films include those available from 3M Company, St. Paul, Minn., under the trade designations "VIKUITI ENHANCED SPECULAR REFLECTOR." Another exemplary reflective film made by laminating a barium sulfate-loaded polyethylene terephthalate film (0.08 mm (2 mils) thick) to a film available from 3M Company under the trade designation "VIKUITI ENHANCED SPECULAR REFLECTOR" using a 0.16 mm (0.4 mil) thick isooctylacrylate acrylic acid pressure sensitive adhesive. Other suitable reflective films include those available from Toray Industries, Inc., Urayasu, Japan, under the trade designation "E-60 SERIES LUMIRROR"; porous polytetrafluoroethylene (PTFE) films from W. L. Gore & Associates, Inc., Newark, Del.; those available from Labsphere, Inc., North Sutton, N.H., under the trade designation "SPECTRALON REFLECTANCE MATERIAL"; those available from Alanod Aluminum-Verdun GmbH & Co., Ennepetal, Germany, under the trade designation "MIRO ANODIZED ALUMINUM FILMS" (including that available under the trade designation "MIRO 2 FILM"); those available from Furukawa Electric Co., Ltd., Tokyo, Japan, under the trade designation "MCPET HIGH REFLECTIVITY FOAMED SHEETING"; and those available from Mitsui Chemicals, Inc., Tokyo, Japan, under the trade designations "WHITE REFSTAR FILMS" and "MT FILMS."

The reflector may be substantially smooth, or it may have a structured surface associated with it to enhance light scattering or mixing. Such a structured surface can be imparted (a) on the reflective surface of the reflector, or (b) on a transparent coating applied to the reflective surface. In the former case, a highly reflecting film may be laminated to a substrate in which a structured surface was previously formed, or a highly reflecting film may be laminated to a flat substrate (e.g., \that available from 3M Company under the trade designation "VIKUITI DURABLE ENHANCED SPECULAR REFLECTOR-METAL (DESR-M) REFLECTOR") followed by forming the structured surface, such as with a stamping operation. In the latter case, a transparent film having a structured surface can be laminated to a flat reflective surface, or a transparent film can be applied to the reflector and then afterwards a structured surface imparted to the top of the transparent film.

The reflector can also be made substantially from reflective films such as that available from 3M Company under the trade designations "VIKUITI ENHANCED SPECULAR REFLECTOR." The latter film is thermoformable and has enhanced UV stability believed to be due to the presence of polymethylmethacrylate skins which encapsulate the multi-layer polymer film structure that exhibits high specular reflectivity. This film can be used to thermoform reflector shapes suitable for a light assembly. This polymer film can be used, for example, as an insert in a pre-formed housing or as a stand alone housing component.

Alternatively, for example, the construction can be modified so that one of the skins is made from a different polymer that offers improved mechanical strength as compared to polymethylmethacrylate. For example, polycarbonate or a polymer blend of acrylonitrile butadiene styrene/polycarbonate can be used to form the second skin. The second skin need not to be transparent. This film can then be thermoformed into the desired reflector shape, oriented with the reflective surface facing the interior of the light assembly and the second skin serving as an external surface. This thermoformed part can be used a stand alone housing component.

The reflector can be a continuous unitary (and unbroken) layer on which the light source is mounted, or it can be constructed discontinuously in separate pieces, or discontinuously insofar as it includes isolated apertures, through which the light source can protrude, in an otherwise continuous layer. For example, strips of reflective material can be applied to a substrate on which rows of LED's are mounted, each strip having a width sufficient to extend from one row of LED's to another and having a length dimension sufficient to span between opposed borders of the backlight's output area.

Optionally, the reflector may comprise areas of differing reflectivity. For example, the reflector could have high reflectivity for all wavelengths near the light source, but reflect primarily one color, such as red, green or blue, far from the source (e.g., a multicolored light assembly with only one light source). The transition between the regions of differing reflectivity could also be gradual.

The reflector can also include sides and ends located along the outer boundary of the reflector that are preferably lined or otherwise provided with high reflectivity vertical walls to reduce light loss and improve recycling efficiency. The same reflective material used for the reflective surface can be used to form these walls, or a different reflective material can be used. In exemplary embodiments, the side walls are specularly reflective.

In some embodiments, the inner major surface of the reflector is parallel to at least 40, 45, 50, 55, 60, 65, 70, 75, 80, 85 or even at least 90 percent of the inner major surface of the curved outer light cover.

In some embodiments, it may be desirable for light to be transmitted from both sides of the light assembly. For example, at least a portion (e.g., at least 1%, 2%, 5%, 10%, 20%, 50%, 75%, or even at least 90%) of the reflector can comprise a transflective surface as described above.

In some embodiments of light assemblies having a reflector, at least a portion of the reflector is also transflective.

In some embodiments of light assemblies described herein, at least 50, 55, 60, 65, 70, 75, 80, 85, 90, 95, 99, or even 100 percent by area of the inner major surface of the reflector is transflective. The non-transflective area may be reflective or absorptive, for example, for aesthetic, cosmetic, or functional reasons.

In some embodiments of light assemblies having a reflector, the reflector comprises first and second areas of reflectivity, wherein the first area of reflectivity is more reflective with respect to a first wavelength of light than the second area of reflectivity, and wherein the second area of reflectivity is more reflective with respect to a second, different wavelength of light than the first area of reflectivity.

In some embodiments, the inner surface of the reflector includes a first region with a first group of structures and a second region with a second, different group of structures.

In some embodiments of light assemblies having a reflector, the reflector is at least partially specularly reflective and/or at least partially semi-specularly reflective. In some embodiments, the inner major surface of the outer light cover is at least partially specularly reflective and/or at least partially semi-specularly reflective.

Some embodiments of light assemblies having a reflector further comprise as diffuser disposed between the outer cover and the inner major surface (in the optical cavity) of the reflector.

Smooth partial reflectors are a type of transflective surface that gain their functionality by modifying the reflective properties of a surface without substantially changing the local geometry. For example, a surface is obtained by sputtering a small amount of metal (e.g., aluminum) onto a surface. As the thickness of the metal layer increases, the reflectivity changes from that calculated by the Fresnel equations up toward the theoretical maximum reflectance of the metal. Between these extremes lies the region of partial reflection.

Examples of smooth partial reflectors include metal/dielectric stacks such as silver (available, for example, from Alanod Westlake Metal Ind., North Ridgeville, Ohio, under the trade designation "MIRO-SILVER") and indium tin oxide (available, for example, from Techplast Coated Products, Inc., Baldwin, N.Y.), polarizing and non-polarizing multilayer optical films (available, for example, from 3M Company, St. Paul, Minn., under the trade designation "VIKUITI DUAL BRIGHTNESS ENHANCEMENT FILM"), polarizing and non-polarizing polymer blends (available, for example, from 3M Company under the trade designation "VIKUITI DIFFUSE REFLECTIVE POLARIZER FILM"), wire grid polarizers (available, for example, from Moxtek, Inc., Orem, Utah), and asymmetric optical films (see, e.g., U.S. Pat. No. 6,924,014 (Ouderkirk et al.) and U.S. Pat. Application having Ser. No. 60/939,084, filed May 20, 2007, and PCT Patent Application No. US2008/064133, the disclosures of which are incorporated herein by reference). Also useful as partial reflectors are perforated partial reflectors or mirrors (e.g., perforating specularly reflective films having an on-axis average reflectivity of at least 98% of any polarization such as described above (e.g., that marketed by 3M Company under the trade designation "VIKUITI ENHANCED SPECULAR REFLECTOR FILM"). Partial reflectors may also be, for example, mirrors or partial mirrors having a pattern of light scattering areas printed thereon. Crossed polarizers can be used as partial reflectors; the angle of crossing can be used to adjust the ratio of transmission to reflection. Also, foams, voided structures, or polymers filled with inorganic particulates such as titanium dioxide ($TiO_2$) can be used.

Optionally, light extraction features can be present on the back reflector so as to preferentially extract light from the hollow cavity over certain regions to redirect some of this guided light out of the light guide toward the output area of the backlight. Features can be uniformly spaced or non-uniformly spaced. For example, the inner surface of the reflector includes a first region with a first group of light extraction features and a second region with a second, different group of light extraction features. Optionally, the inner surface of the reflector includes a repeating pattern of light extraction features.

Gradient extraction can be accomplished by any element that increases or decreases locally the amount of light extraction. Since the inner reflector generally has some degree of angularly selective transmission, an extraction element that deviates additional light into the angular range of higher transmission will increase the brightness in that region. The extraction zone is generally toward normal, but can be designed to be at oblique angles. The material that is used for the extraction element can be specular, semispecular or diffuse, translucent, transflective, refractive, diffractive. Refractive elements can be prisms, lenslets, lenticulars, and the like. Extraction elements may be applied by printing, casting, etching, transfer (for example adhesive backed dots), lamination, etc. Extraction elements can be made by local deviations in a reflective surface such as embossing, peening, corrugating, abrading, or etching.

Achieving a desired gradient can be accomplished, for example, by changing the light re-directing properties of a diffusing coating locally or gradually across the surface area. This could be accomplished with, for example, a change in thickness, composition, or surface properties. Perforations would be another option, for example, a diffusing film having a gradient of perforations placed over the back reflector.

The gradient can be smoothly varying in a monotonic fashion. It can be abrupt such as in the case of one circular patch of diffuse reflector on a specular backplane to make a bright center.

In some embodiments of lighting assemblies described herein, the inner surface of the reflector includes a first region with a first group of light extraction features, and wherein the first light source is at least partially disposed within the first group of light extraction features.

Exemplary light sources include light sources known in that art such as incandescent lights, light emitting diodes ("LEDs"), and arc lamps. They may have any desired output pattern, and may emit a desired color or act as a broadband source which is later filtered. Light assemblies may have 1 or more (e.g., 2, 3, 4, 5, 6, 7, 8, 9, or more) light sources (e.g., 1, 2, 3, 4, 5, etc. incandescent lights, halogen lights, and or LEDs, etc.).

The light source(s) can be positioned to introduce through a hole or window in the reflector wall, be within, or partially within the optical cavity, including any side wall(s).

In some embodiments, the LED may be used with a wedge-shaped reflector so that light may be emitted into the enclosure with a restricted or partially collimated angular distribution. Further, in some embodiments, light sources that at least partially collimate the emitted light may be preferred. Such light sources can include lenses, extractors, shaped encapsulants, or combinations thereof of optical elements to provide a desired output into the enclosure. Further, the lighting output sources can include injection optics that partially collimate or confine light initially injected into the enclosure to propagate in directions close to a transverse plane (the transverse plane being parallel to the output area of the lighting output source) (e.g., an injection beam having an average deviation angle from the transverse plane in a range from 0° to 45°, or 0° to 30°, or even 0° to 15°).

Optionally, the light source includes a light guide (e.g., light fiber) at least partial within the cavity, the light fiber comprising a core and a clad having a refractive index lower than that of the core on the periphery of the core, wherein the light fiber has a light diffusive and reflective portion formed by co-extrusion at least on the inner periphery of the clad. Optionally, the diffusive and reflective portion comes into contact with the core. Optionally the light diffusive and reflective portion has a thickness extending at least to the vicinity of outer periphery of the clad in a direction perpendicular to the longitudinal direction from the clad. Optionally, the light diffusive and reflective portion is formed in a predetermined thickness extending from the inner periphery surface of the clad to the core portion in a direction perpendicular to the longitudinal direction of the clad. Optionally, the light diffusive and reflective portion extends into within the core. Optionally, the diffusive and reflective portion is formed a linear shape or a band-like shape along the longitudinal direction of the clad.

Optionally, the light fiber can be of a single material (light guide) and can incorporate light extraction structures (optical elements) that extract the light. In order to maintain a substantially uniform output illumination along the light emitting region of the fiber, the morphology, pattern and spacing of successive optical elements may be controlled so as to compensate for the light reflected out of the fiber by preceding elements. For example, the cross-sectional area of the reflecting surface(s) of successive optical elements may be increased in the direction of intended light travel. Alternatively, the spacing between successive optical elements may be decreased or the angle of the reflecting surface(s) changed, or a combination of any or all of these methods may be used.

In order to provide more light in broader angles one can incorporate more than one row (axis) of optical elements. It will be apparent to one of ordinary skill in the art that the minimum angular displacement δ is slightly greater than 0°, in which case the axes are nearly coincident, and the maximum angular displacement δ is 180°. In practice, the displacement δ between first longitudinal axis and second longitudinal axis is governed primarily by functional considerations. More particularly, the angular displacement δ is determined by the desired angular spread of the divergence cone of reflected light in the lateral (e.g., cross-fiber) dimension and may be determined using optical modeling techniques known to one of ordinary skill in the art. For many applications where the optical fiber is used to illuminate a broad area, angular displacements of up to 100° are useful to spread the emerging light into a broad angular distribution. By contrast, in applications where the optical fiber is viewed directly such as, for example, a vehicle warning light, it may be desirable to narrow the lateral dimension of the angular distribution of emerging light to concentrate the light within a desired angular range. For such applications, angular displacements δ between about 5° and 20° are useful.

When multiple light sources are utilized in a single optical cavity, light mixing will occur. The emitted light color of each individual zone can be tailored, for example, by the light source spacing, the light source intensity, the light source color, the outer light cover, and/or the spacing between the reflector and the outer light cover and/or inner lens.

Another benefit associated with disposing optical elements about distinct longitudinal axes extending along the surface of an optical fiber relates to shadowing effects in the fiber. Shadowing effects are discussed at length below. In brief, each optical element in an optical fiber shadows the adjacent optical element from a portion of the light rays propagating through an optical fiber. The degree of shadowing is proportional to the depth to which the optical element extends into the optical fiber. Providing optical elements disposed about two distinct longitudinal axes on the surface of an optical fiber reduces detrimental effects associated with shadowing by allowing light to be spread into a broader divergence cone without resorting to deeper optical elements as required in single axis embodiments. Additionally, because the optical elements are displaced from one another, shadowing effects are spread more evenly around the perimeter of the optical fiber, making their effects less noticeable.

In some embodiments, it is desired to produce an illumination pattern in the x-z plane that is relatively narrowly confined in the vertical (y) direction but which provides roughly uniform intensity in the horizontal (x) direction. For example, it may be desirable for the intensity of the light in the horizontal direction to be roughly uniform over +/−45 degrees. An illumination device having a series of uniformly configured light extraction structures (optical elements) will not yield such an intensity pattern. However, a variety of different intensity patterns may be produced by providing a series of light extraction structures that have different configurations. For example, by providing a plurality of light extraction structures having several different notch angles the intensity pattern can be tailored for a given application. That is, the notch angle can become an adjustable parameter that can be varied to produce desired illumination patterns. For additional details on light fibers, see U.S. Pat. No. 6,563,993 (Imamura et al.).

In some embodiments, the light source(s) is placed through holes in the reflector. For example, they may be placed through the portion of the reflector which is parallel to the inner surface of the outer cover, through the sides or ends of the reflector where the separation between the reflector and the outer light cover is decreasing.

In some embodiments, at least 10% (in some embodiments, at least 15%, 20%, 25%, 30%, 35%, 40%, 45%, 50%, 55%, 60%, 65%, 70%, 75%, 80%, 85%, or even at least 90%) of the outer major surface of the curved outer light cover is retroreflective.

Suitable light emitting diodes are known in the art, and commercially available, including LEDS having a light extraction cone in a range from 20° to 30° and LEDs having a Lambertian light emission pattern. LEDs are available in a variety of power usage ratings, including those ranging from less than 0.1 to 10 watts (e.g., power usage ratings up to 0.1, 0.25, 0.5, 0.75, 1, 2.5, 5, or even up to 10 watts) per LED. LEDs are available, for example, in colors ranging range from ultraviolet (less than about 400 nm) to infrared (beyond 700 nm). Basic colors of LEDs are blue, green, red and amber, although other colors, as well as white, are obtainable by mixing the basic colors or adding phosphors.

In some embodiments, and typically desirably, the light emitting diodes, when energized have a uniform luminous exitance. Luminous exitance refers to the amount of light emitted, in lumens, per unit area. The degree of required uniformity varies with the application. LCDs generally require uniformity to be greater than 80%, as specified in VESA-2001-6. Other applications, such as signs and vehicle lights do not have as clear a definition of uniformity, but the total change from the brightest point to the dimmest should not be noticeable, nor should there be any localized gradients in luminous exitance so great as to be obvious. In some embodiments, light assemblies described herein have up to 5 light emitting diodes per 100 $cm^2$.

In some embodiments, lighting assemblies described herein have a total power usage of up to 15 watts, 10 watts, or even up to 5 watts.

In some embodiments (e.g., vehicle components), it is desirable to for the light assembly (e.g., the optical cavity) to be sealed, for example, against dust and/or moisture penetration.

Figure 11:
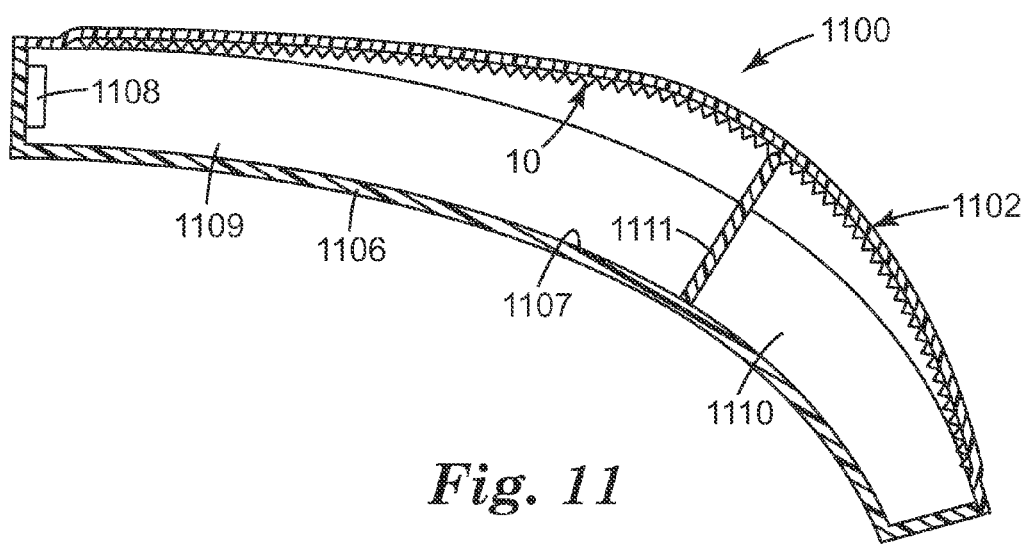

Optionally, lighting assembly further comprising a tinted transmissive element(s) (e.g., a film(s)) (i.e., at least 20% (optionally, at least 25%, 30%, 35%, 40%, 45%, 50%, 55%, 60%, 70%, 75%, 80%, 85%, or even at least 90%) of the photons for at least one wavelength in the of light (e.g., in the visible spectrum) striking the element are transmitted through and exit the element) disposed between the transflective surface and the reflector. The transparent tinted element can be, for example, between inner major surface of the outer light and the reflector, between the first light and the inner major surface of the outer light, and/or between the first light source and the reflector. In some embodiments, a transparent tinted element can be positioned in the optical cavity and/or between the inner lens and the outer cover to provide a first zone of a first color, and a second zone of a second, different color. For example, referring to FIG. 11, exemplary light assembly 1100 has curved outer light cover 1102, reflector 1106 having inner major surface 1107, light emitting diode 1108, transparent tinted element 1111, and zones 1109, 1110. Transflective article 10 is attached to inner major surface of outer light cover 1102.

One or more colors of transparent tinted elements may be used. Suitable films are known in the art and include tinted (e.g., dyed or pigmented) films and color shifting films. Transmissive tinted and color shifting films are available, for example, from 3M Company under the trade designation "SCOTCHCAL 3630" in about 60 different colors.

"Color shifting film" as used herein refers to a film comprising alternating layers of at least a first and second layer type, wherein the first layer type comprises a strain hardening polymer (e.g., a polyester), wherein the film has at least one transmission band and one reflection band in the visible region of the spectrum, the transmission band having an average transmission of at least 70%, and wherein at least one of said transmission band and reflection band varies at normal incidence by less than about 25 nm over a square inch. Optionally, the film comprises alternating polymeric layers of at least a first and a second layer type, wherein the film has at least one transmission band and at least one reflection band in the visible region of the spectrum, and wherein at least one of the transmission band and reflection band has a band edge that varies at normal incidence by no more than 8 nm over a distance of at least 2 inches along each of two orthogonal axes in the plane of the film. Optionally, at least one of the transmission band and the reflection band has a bandwidth at normal incidence that varies by no more than 2 nm over a surface area of at least 10 $cm^2$. Optionally, the film has exactly one transmission band in the visible region of the spectrum. Optionally, the film has exactly one reflection band in the visible region of the spectrum. Color shifting films can be made, for example, as described in U.S. Pat. No. 6,531,230 (Weber et al.), the disclosure of which is incorporate herein by reference; additional details regarding such films can also be found in said patent.

In some embodiments, a semi-specular element can be disposed in the cavity (e.g., between inner major surface of the curved outer light and the reflector, between the first light and the inner major surface of the curved outer light, and/or between the first light source and the reflector (i.e., similar to the transparent tinted element described above with respect to FIG. 11).

Optionally, light assemblies can include a light sensor(s) and feedback system to detect and control, for example, brightness and/or color of light from the light source(s). For example, a sensor can be located near the light source(s) to monitor output and provide feedback to control, maintain, and/or adjust brightness and/or color. It may be beneficial, for example, to locate a sensor(s) along an edge and/or within the cavity to sample the mixed light. In some instances it may be beneficial, for example, to provide a sensor(s) to detect ambient light in the viewing environment (e.g., the room that the display is in or for an automotive taillight) whether it is day or night. Control logic can be used, for example, to appropriately adjust the output of the light source(s) based on ambient viewing conditions. Suitable sensor (s) are known in the art (e.g., light-to-frequency or light-to-voltage sensors), and are commercially available, for example, from Texas Advanced Optoelectronic Solutions, Plano, Tex.). Additionally, or alternatively, a thermal sensor(s) may be used to monitor and control the output of the light source(s). These sensor techniques can be used, for example, to adjust light output based on operating conditions and compensation for component aging over time.

Optionally, light assemblies further comprise additional support features (e.g., a rod or the like), including within a portion of the optical cavity.

Exemplary Embodiments

1. A transflective article comprising:
    a first layer having a major surface having a plurality of apertures therein; and
    a second layer having a major transflective surface.
2. The transflective article of embodiment 1, wherein the major transflective surface faces away from the apertures of the first layer.
3. The transflective article of embodiment 1, wherein the major transflective surface faces toward the apertures of the first layer.
4. The transflective article of any preceding embodiment, further comprising a third layer having a major surface having at least one visible light absorbing area.
5. The transflective article of any of embodiments 1 to 3, further comprising a third layer having a major surface having a plurality of visible light absorbing areas.
6. The transflective article of either embodiment 4 or 5, wherein at least a portion of the visible light absorbing area is printed.
7. The transflective article of any of embodiments 4 to 6, wherein transflective surface faces the major surface of the third layer having at least one visible light absorbing area.
8. The transflective article of any of embodiments 4 to 7, wherein the first, second, and third layers are sequentially in that order.
9. The transflective article of any of embodiment 4 or 7, wherein the third layer is between the first and second layers.
10. The transflective article of any preceding embodiment, wherein at least a portion of the major transflective surface is curved.
11. The transflective article of any preceding embodiment, wherein the first layer is made of a material that is optically transparent to visible light.
12. The transflective article of any of any preceding embodiment, wherein the first layer is made of a material that is opaque to visible light.
13. The transflective article of any preceding embodiment, wherein the apertures of the first layer have a regular pattern.
14 The transflective article of embodiments 1 to 12, wherein the apertures of the first layer have a gradient pattern.
15. The transflective article of any preceding embodiment, wherein the apertures of the first layer have at least one of the following shapes: circular, elliptical, solid line, triangular, square, rectangular, hexagonal, or other polygons.
16. The transflective article of any preceding embodiment, wherein the apertures of the first layer have the shape of an at least one of alphanumerics or trademark indicia.
17. The transflective article of any preceding embodiment, wherein the apertures of the first layer comprise at least 50 (in some embodiments, at least 75; in some embodiments, in a range from 50 to 80) percent by area of the first major surface of the first layer.
18. The transflective article of any preceding embodiment, wherein the apertures of the first layer have a largest dimension in a range from 0.5 mm to 25 mm (in some embodiments, 0.75 mm to 10 mm, or even 0.75 mm to 5 mm).
19. The transflective article of any preceding embodiment, wherein the first and second layers are integral.
20. The transflective article of any of embodiments 1 to 18, wherein the first and second layers are secured together at least in part via a pressure sensitive adhesive.
21. The transflective article of embodiment 20, wherein the pressure sensitive adhesive is repositionable.
22. The transflective article of any of embodiments 1 to 182, wherein the first and second layers are secured together at least in part via a permanent adhesive.
23. The transflective article of any of embodiments 1 to 18, wherein the first and second layers are heat laminated together.
24. The transflective article of any preceding embodiment, wherein the major transflective surface comprises microstructures.
25. The transflective article of embodiment 24, wherein the microstructures are in a repeating pattern.
26. The transflective article of either embodiment 24 or 25, wherein the microstructures are comprised of a plurality of shapes having a height to base length ratio greater than 0.1:1 (in some embodiments, 0.2:1, 0.3:1, or even greater than 0.4:1).
27. The transflective article of any of embodiments 24 to 26, wherein the microstructures include a first region with a first group of microstructures and a second region with a second, different group of microstructures.
28. A light assembly comprising a light source and the transflective article of any preceding embodiment, wherein the transflective surface face the light source.
29. A light assembly comprising a light source and the transflective article of any of embodiments 1 to 27, wherein the plurality of apertures of the first layer are closer to the light source than is the transflective surface.
30. A light assembly comprising a light source and the transflective article of any of embodiments 1 to 27, wherein the transflective surface are closer to the light source than is the plurality of apertures of the first layer.
31. A light assembly comprising:
    the transflective article of any of embodiments 1 to 27;
    an outer light cover having an outer major surface;
    a reflector having an inner major surface, wherein the transflective article is disposed between the outer major surface of the outer light cover and the inner major surface of the reflector; and
    a first light source,
    wherein there is an optical cavity between the transflective article and the reflector, wherein the transflective surface face the light source, and wherein the first light source is positioned to introduce light into the optical cavity.
32. The light assembly of embodiment 31, wherein the plurality of apertures of the first layer are closer to the light source than is the transflective surface.
33. The light assembly of embodiment 31, wherein the transflective surface are closer to the light source than is the plurality of apertures of the first layer.
34. The lighting assembly of any of embodiments 31 to 33, wherein the transflective surface is convex relative to the inner major surface of the reflector.
35. The lighting assembly of any of embodiments 31 to 34, wherein the reflector is at least partially specularly reflective.
36. The lighting assembly of any of embodiments 31 to 34, wherein the reflector is at least partially semi-specularly reflective.
37. The lighting assembly of any of embodiments 31 to 36, wherein the transflective is at least partially specularly reflective.

38. The lighting assembly of any of embodiments 31 to 37, wherein at least a portion of the major transflective surface is curved, and wherein the inner major surface of the reflector is substantially parallel to at least 30 (in some embodiments, 50, 75, or even at least 90) percent by area of the curved portion of the transflective surface.

39. The lighting assembly of any of embodiments 31 to 37, further comprising as diffuser disposed between the outer cover and the inner major surface of the reflector.

40. The lighting assembly of any of embodiments 31 to 39, wherein the inner surface of the reflector includes a first region with a first group of light extraction features and a second region with a second, different group of light extraction features.

41. The lighting assembly of any of embodiments 31 to 40, wherein the inner surface of the reflector includes a repeating pattern of light extraction features.

42. The lighting assembly of any of embodiments 31 to 41 having a length to depth ratio greater than 2:1 (in some embodiments, 3:1, 5:1, 10:1, 25:1, 50:1, or even greater than 75:1).

43. The lighting assembly of any of embodiments 31 to 42 wherein the light source is at least one light emitting diode.

44. The lighting assembly of any of embodiments 31 to 43, wherein the first light source includes a light guide positioned at least partially within the optical cavity.

45. The lighting assembly of any of embodiments 31 to 44, further comprising a transparent tinted element between inner major surface of the outer light and the reflector.

46. The lighting assembly of any of embodiments 31 to 44, further comprising a transparent tinted element between the first light and the inner major surface of the outer light cover.

47. The lighting assembly of any of embodiments 31 to 46, further comprising a transparent tinted element between the first light source and the reflector.

48. The lighting assembly of any of embodiments 31 to 47, wherein a transparent tinted element is positioned in the optical cavity to provide a first zone of a first color, and a second zone of a second, different color.

49. The lighting assembly of any of embodiments 31 to 48, further comprising a semi-specular element disposed in the cavity.

50. The lighting assembly of any of embodiments 31 to 49, wherein the reflector is also transflective.

51. The lighting assembly of any of embodiments 31 to 50, wherein the outer light cover has an outer major surface that is at least 10% (in some embodiments, 25%, 50%, 75%, or even at least 90%) retroreflective.

52. The lighting assembly of any of embodiments 31 to 51, wherein the reflector comprises first and second areas of reflectivity, wherein the first area of reflectivity is more reflective with respect to a first wavelength of light than the second area of reflectivity, and wherein the second area of reflectivity is more reflective with respect to a second, different wavelength of light than the first area of reflectivity.

53. The lighting assembly of any of embodiments 31 to 51, wherein the transflective surface comprises first and second areas of transflectivity, wherein the first area of transflectivity is more transflective with respect to a first wavelength of light than the second area of transflectivity, and wherein the second area of transflectivity is more transflective with respect to a second, different wavelength of light than the first area of transflectivity.

54. The lighting assembly any of embodiments 31 to 53, further comprising wherein a light sensor.

55. The lighting assembly of any of embodiments 31 to 54, further comprising wherein a thermal sensor.

56. A sign comprising the light assembly of any of embodiments 31 to 55.

57. A backlight comprising the light assembly of any of embodiments 31 to 55.

58. A display comprising the light assembly of any of embodiments 31 to 55.

59. Task lighting comprising the light assembly of any of embodiments 31 to 55.

60. A luminaire comprising the light assembly of any of embodiments 31 to 55.

61. The light assembly of any of embodiments 31 to 55 which is a vehicle component.

62. The light assembly of any of embodiments 31 to 55 which is a vehicle tail light assembly.

63. A vehicle comprising the lighting assembly of any of embodiments 31 to 55.

64. A light assembly comprising:
  an outer light cover having an outer major surface;
  the transflective article of any of embodiments 1 to 27;
  a reflector having a inner major surface, wherein the transflective article is disposed between the outer major surface of the outer light cover and the inner major surface of the reflector; and
  a first light source,
wherein there is an optical cavity between the outer light cover and the reflector, and wherein the first light source is positioned to introduce light into the optical cavity, wherein the inner major surface of the reflector is oriented to the transflective surface so that the separation between the two surfaces decreases along a distance away from the light source, and wherein the maximum local ratio of decrease in separation to distance is less than 0.8:1.

65. The light assembly of embodiment 64, wherein the plurality of apertures are closer to the light source than is the transflective surface.

66. The light assembly of embodiment 64, wherein the transflective surface are closer to the light source than is the plurality of apertures.

67. The lighting assembly of any of embodiments 64 to 66, wherein the maximum local ratio of decrease in separation to distance is less than 0.7:1 (in some embodiments, 0.6:1, 0.5:1, 0.4:1, 0.35:1, 0.3:1, 0.25:1, 0.2:1, 0.15:1, 0.1:1, or even less than 0.05:1).

68. The lighting assembly of any of embodiments 64 to 67, wherein the inner major surface of the outer light cover is convex relative to the reflector.

69. The lighting assembly of any of embodiments 64 to 68, wherein the reflector is at least partially specularly reflective.

70. The lighting assembly of any of embodiments 64 to 69, wherein the reflector is at least partially semi-specularly reflective.

71. The lighting assembly of any of embodiments 64 to 70, wherein the inner major surface of the outer light cover is at least partially specularly reflective.

72. The lighting assembly of any of embodiments 64 to 71, wherein the inner major surface of the outer light cover is at least partially semi-specularly reflective.

73. The lighting assembly of any of embodiments 64 to 72, further comprising as diffuser disposed between the outer cover and the inner major surface 74. The lighting assembly of any of embodiments 64 to 73, wherein the inner surface of the reflector includes a first region with a first group of light extraction features and a second region with a second, different group of light extraction features.

75. The lighting assembly of any of embodiments 64 to 74, wherein the inner surface of the reflector includes a repeating pattern of light extraction features.
76. The lighting assembly of any of embodiments 64 to 75 having a length to depth to length ratio greater than 2:1 (in some embodiments, 3:1, 5:1, 10:1, 25:1, 25:1, 50:1, or even at least 75:1).
77. The light assembly of any 64 to 76, wherein the light source is at least one light emitting diode.
78. The lighting assembly of any of embodiments 64 to 77, further comprising a transparent tinted element between inner major surface of the outer light and the reflector.
79. The lighting assembly of any of embodiments 64 to 78, further comprising a transparent tinted element between the first light and the inner major surface of the outer light.
80. The lighting assembly of any of embodiments 64 to 79, further comprising a transparent tinted element between the first light source and the reflector.
81. The lighting assembly of any of embodiments 64 to 80, wherein a transparent tinted element is positioned in the optical cavity to provide a first zone of a first color, and a second zone of a second, different color.
82. The lighting assembly of any of embodiments 64 to 81, further comprising a semi-specular element between the first light source and the reflector.
83. The lighting assembly of any of embodiments 64 to 82, wherein the reflector is also transflective.
84 The lighting assembly of any of embodiments 64 to 83, wherein the outer light cover has an outer major surface that is at least 10% (in some embodiments, 25%, 50%, 75%, or even at least 90%) retroreflective.
85. The lighting assembly of any of embodiments 64 to 84, wherein the reflector comprises first and second areas of reflectivity, wherein the first area of reflectivity is more reflective with respect to a first wavelength of light than the second area of reflectivity, and wherein the second area of reflectivity is more reflective with respect to a second, different wavelength of light than the first area of reflectivity.
86. The lighting assembly of any of embodiments 64 to 85, wherein the transflective surface comprises first and second areas of transflectivity, wherein the first area of transflectivity is more transflective with respect to a first wavelength of light than the second area of transflectivity, and wherein the second area of transflectivity is more transflective with respect to a second, different wavelength of light than the first area of transflectivity.
87. The lighting assembly of any of embodiments 64 to 86, further comprising wherein a light sensor.
88. The lighting assembly of embodiments 64 to 87, further comprising wherein a thermal sensor.
89. A sign comprising the light assembly of any of embodiments 64 to 88.
90. A backlight comprising the light assembly of any of embodiments 64 to 88.
91. A display comprising the light assembly of any of embodiments 64 to 88.
92. Task lighting comprising the light assembly of any of embodiments 64 to 88.
93. A luminaire comprising the light assembly of any of embodiments 64 to 88.
94. The light assembly of any of embodiments 64 to 88 which is a vehicle component.
95. The lighting assembly of any of embodiments 64 to 88 which is a vehicle tail light assembly.
96. A vehicle comprising the lighting assembly of any of embodiments 64 to 88.

97. A light assembly comprising:
    an outer light cover having a first and second generally opposed major surfaces, and a first zone having a first color, and a second zone having a second, at least one of different color or being clear, the second major surface being an inner major surface;
    a reflector having an inner major surface that is parallel to at least 30 percent of the inner major surface of the outer light cover;
    the transflective article of any of embodiments 1 to 34 disposed between the outer light cover and the reflector, the inner lens having first and second generally opposed major surfaces; and
    a first light source that emits a first color when energized; wherein there is an optical cavity between inner major surface of the transflective surface and the inner major surface of the reflector, and wherein the first light source is selected and positioned to introduce light into the optical cavity such that, when energized, provides the same color for the first and second zones when viewed from the first major surface of the outer cover.
98. The light assembly of embodiment 97, wherein the plurality of apertures are closer to the light source than is the transflective surface.
99. The light assembly of embodiment 97, wherein the transflective surface are closer to the light source than is the plurality of apertures.
100. The lighting assembly of any of embodiments 97 to 99, wherein the first color of the first zone is red, and wherein the first color of the first light source is red.
101. The lighting assembly of any of embodiments 97 to 100, further comprising a second light source that emits a second color when energized, different than the first color of the first light source, wherein the second light source is selected and positioned to introduce light into the optical cavity such that, when energized, provides the same color for the first zone when viewed from the first major surface of the outer cover.
102. The lighting assembly of embodiment 97, wherein the second light source is selected and positioned to introduce light into the optical cavity such that, when energized, also provides the second color for the second zone when viewed from the first major surface of the outer cover.
103. The lighting assembly of either embodiment 97 or 102, wherein the first and second light sources are in a single optical cavity.
104. The lighting assembly of either embodiment 97 or 102, wherein the first and second light sources are not in a single optical cavity.
105. The lighting assembly of any of embodiments 97 to 104, wherein the second color of the second zone is white, and wherein the second color of the second light source is white.
106. The lighting assembly of any of embodiments 97 to 104, wherein the second zone is clear, and wherein the second color of the second light source is white.
107. The lighting assembly of any of embodiments 97 to 106, wherein the first and second light source are within a single optical cavity.
108. The lighting assembly of any of embodiments 97 to 107, further comprising a third light source that emits a third color when energized, is the same as the first light source when energized, but brighter, than the first color of the first light source, wherein the third light source is selected and positioned to introduce light into the optical cavity such that, when energized, provides a light intensity brighter than the intensity of the first light source when viewed from the first major surface of the outer cover.

109. The lighting assembly of any of embodiments 97 to 108, further comprising a fourth light source that emits a fourth color when energized, different than both the first color of the first light source and the second color of the second light source, wherein the fourth light source is selected and positioned to introduce light into the optical cavity such that, when energized, provides a color different from the first and second light sources when viewed from the first major surface of the outer cover.

110. The lighting assembly of embodiment 109, wherein the third color of the third zone is amber, and wherein the third color of the third light source is amber.

111. The lighting assembly of any of embodiments 97 to 110, wherein the inner surface of the reflector includes a first region with a first group of light extraction features, and wherein the first light source is at least partially disposed within the first group of light extraction features.

112. The lighting assembly of any of embodiments 97 to 111, wherein the inner major surface of the outer light cover is generally convex relative to the reflector.

113. The lighting assembly of any of embodiments 97 to 112, wherein the reflector is at least partially specularly reflective.

114. The lighting assembly of any of embodiments 97 to 113, wherein the reflector is at least partially semi-specularly reflective.

115. The lighting assembly of any of embodiments 97 to 114, wherein the inner major surface of the outer light cover is at least partially specularly reflective.

116. The lighting assembly of any of embodiments 97 to 115, wherein the inner major surface of the outer light cover is at least partially semi-specularly reflective.

117. The lighting assembly of any of embodiments 97 to 116, wherein at least a portion of the major transflective surface is curved, and wherein the inner major surface of the reflector is substantially parallel to at least 30 percent by area of the curved portion of the transflective surface.

118. The lighting assembly of any of embodiments 97 to 116, wherein at least a portion of the major transflective surface is curved, and wherein the inner major surface of the reflector is substantially parallel to at least 50 (in some embodiments, 75, or even at least 90) percent by area of the curved portion of the transflective surface.

119. The lighting assembly of any of embodiments 97 to 118, further comprising as diffuser disposed between the outer cover and the inner major surface of the reflector.

120. The lighting assembly of any of embodiments 97 to 119, wherein the inner surface of the reflector includes a first region with a first group of light extraction features and a second region with a second, different group of light extraction features.

121. The lighting assembly of any of embodiments 97 to 120, wherein the inner surface of the reflector includes a repeating pattern of light extraction features.

122. The light assembly of any of embodiments 97 to 121 having a length to depth ratio greater than 2:1 (in some embodiments, 3:1, 5:1, 10:1, 25:1, 50:1, or even at greater than 75:1).

123. The lighting assembly of any of embodiments 97 to 122, wherein the first and second light sources are each light emitting diodes.

124. The lighting assembly of any of embodiments 97 to 123, wherein the first light source includes a light guide positioned at least partially within the optical cavity.

125. The lighting assembly of any of embodiments 97 to 124, further comprising a transparent tinted element between inner major surface of the outer light and the reflector.

126. The lighting assembly of any of embodiments 97 to 125, further comprising a semi-specular element disposed in the cavity.

127. The lighting assembly of any of embodiments 97 to 126, wherein the reflector is also transflective.

128. The lighting assembly of any of embodiments 97 to 127, wherein the outer light cover has an outer major surface that is at least 10% (in some embodiments, 25%, 50%, 75%, or even at least 90%) retroreflective.

129. The lighting assembly of any of embodiments 97 to 128, wherein the reflector comprises first and second areas of reflectivity, wherein the first area of reflectivity is more reflective with respect to a first wavelength of light than the second area of reflectivity, and wherein the second area of reflectivity is more reflective with respect to a second, different wavelength of light than the first area of reflectivity.

130. The lighting assembly of any of embodiments 97 to 129, wherein the transflective surface comprises first and second areas of transflectivity, wherein the first area of transflectivity is more transflective with respect to a first wavelength of light than the second area of transflectivity, and wherein the second area of transflectivity is more transflective with respect to a second, different wavelength of light than the first area of transflectivity.

131. A sign comprising the light assembly of any of embodiments 97 to 130.

132. A backlight comprising the light assembly of any of embodiments 97 to 130.

133. A display comprising the light assembly of any of embodiments 97 to 130.

134. The light assembly of any of embodiments 97 to 130 which is a vehicle component.

135. The light assembly of any of embodiments 97 to 130 which is a vehicle tail light assembly.

136. A vehicle comprising the lighting assembly of any of embodiments 97 to 130.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Example 1

A microstructured, cube corner, polycarbonate film comprising preferred geometry (PG) cube corner elements was prepared using an extrusion process with tooling made from multigenerational replicas of PG cubes formed on laminae. Using an extrusion process to produce a microstructured film from a microstructured tool is known in the art and is generally described in U.S. Pat. No. 5,450,235 (Smith et al.) and U.S. Pat. No. 7,364,421 (Erickson et al.), the disclosures of which are incorporated herein by reference. The tooling used in this example is generally described in U.S. Pat. No. 7,329,012 (Smith), with detailed construction as follows. Forward canted cubes such as those shown in FIG. 11 of U.S. Pat. No. 7,329,012 (Smith) were used. The forward canted PG cubes were formed on laminae with a thickness of 0.173 mm (0.0068 inch). The spacing between the side grooves was 0.104 mm (0.00408 inch). The side groove included angle was nominally 90 degrees, and the grooves were oriented at nominally 45 degrees relative to the top surface (reference plane 26 of FIG. 3 of U.S. Pat. No. 7,329,012 (Smith)) of each lamina. Each side groove formed cube faces on two adjacent PG cube corners. The cube faces formed by the side grooves were nominally orthogonal (form a 90 degree angle) with the primary groove face. The primary groove face on each laminae was also oriented at nominally 45 degrees relative to the top surface (reference plane 26 of FIG. 3 of U.S. Pat. No. 7,329,012 (Smith)). The height of the cubes in the z-direction (as defined in U.S. Pat. No. 7,329,012 (Smith)) from the peak to the lowest point was 0.160 mm (0.00628 inch). Skew and inclination were used during the formation of the cubes on the laminae to introduce slight dihedral errors into the cubes in order to control retroreflective performance. The master mold was formed from a plurality of laminae where the cubes of adjacent laminae had opposing orientations. As described in U.S. Pat. No. 7,329,012 (Smith), multiple negative replicas of the original PG cube master mold were tiled together to form the final tool. These replicas were formed by electroplating the surface of the master mold to form negative copies, subsequently electroplating the negative copies to form positive copies, electroplating the positive copies to form a second generation negative copy, and continuing until enough replicas were made to assemble the tool.

The microstructured, cube corner, polycarbonate film comprising preferred geometry (PG) cube corner elements described above was modified by first using photolithography to expose and develop a photoresist to form a hexagonal array on its microstructured surface. Three layers of 0.05 mm (2 mil) thick (each) dry-film photoresist (obtained under the trade designation "MP520" from MacDermid, Waterbury, Conn.) were laminated to the structured side of the substrate. The liner for the first two layers was removed prior to laminating the subsequent layer. The resulting material was then flood exposed through a 35% open area, hexagonal patterned mask using a UV flood exposure system (obtained under the trade designation "COLIGHT" from Colight, Farfield, N.J.). The unpatterned side of the polycarbonate sheet was then laminated to a stainless steel plate using a printing tape (obtained under the trade designation "FLEX-MOUNT PRINTING TAPE" from 3M Company, St. Paul, Minn.), and the photoresist was developed to expose the cube corner pattern in the open hexagonal areas. The patterned surface was then conventionally electroformed to make a flat Ni tool. The resultant tool pattern had a hexagonal edge length of 1.75 mm and a feature depth of about 0.12 mm.

This tool was then used to emboss the structure into a polymer sheet to form a transflective sheet. A 1.5 mm (1/16 inch) thick clear polyethylene terephthalate co-polymer (PETG) sheet (obtained from McMaster-Carr, Chicago, Ill.) was embossed by heating it to 150° C. (300° F.) and pressing it against the mold (tool).

Example 2

A light assembly was constructed as generally shown in FIGS. 7 and 7A having an outer cover, a separate, transflective element, a curved reflector, and a light emitting diode mounted through a hole in the reflector. The light emitting diode was obtained under the trade designation "OSRAM DIAMOND DRAGON" (part number LA W5AP) from Osram Opto Semiconductors, Inc, Santa Clara, Calif., and was powered by a 1.5 A current limiting power supply. The outer cover was the outer lens from a 2008 Buick Enclave available from General Motors, Detroit, Mich.

A transflective sheet as described in Example 1 was thermoformed into the gross geometry of the transflective element of the light assembly. This gross geometry was such that at the periphery, the sheet made even contact with the mounting flange of the outer cover; the microstructured side of the transflective face was oriented toward the reflector. Further, the inside of the periphery approximated a torus with radii of 180 mm and 300 mm. The same process was used to make the form for the reflector. The reflector had sides and a back, with a thickness of 2 mm, joined with a blend radius of 3 mm. The sides joined the outer cover and the transflective sheet at the outer cover's flange, and extend back from this flange perpendicularly. The back of the reflector was a torus with the same radii as the transflective sheet, so that the distance between the two is constant everywhere except near the area between the back of the reflector and its sides. The inner surface of the reflector substrate was covered with a reflective film (available from 3M Company under the trade designation "VIKUITI ENHANCED SPECULAR REFLECTOR FILM"), which is laminated to it using a pressure sensitive adhesive (available from 3M Company under the trade designation "3M ADHESIVE TRANSFER TAPE 9471LE").

The light emitting diode was mounted through the reflector substrate, with the light being admitted into the volume between the reflector and the transflective film through a 2 mm hole in the reflective film. The hole was located under the elliptical flat portion of the outer cover.

Example 3

Example 3 was prepared as described for Example 2, except the light emitting diode was in a sidewall as shown in FIG. 3.

Example 4

A microstructured, cube cornered polycarbonate film was obtained as described in Example 1. A perforated window film with 50% open area (available from 3M Company under the trade designation "SCOTCHCAL PERFORATED WINDOW GRAPHIC FILM IJ8171") was hand laminated to the microstructured side of the microstructured, cube corner, polycarbonate film resulting in a transflective sheet.

Example 5

A light assembly was constructed as described in Example 2, except that the transflective sheet was made according to Example 4. The light from this assembly appeared slightly darker at points furthest from the light source than at points closest to the light source. A circle pattern present in the perforated film was readily apparent in the light assembly.

Example 6

A microstructured, cube cornered polycarbonate film was obtained as described in Example 1. A perforated window film with 30% open area (available from 3M Company under the trade designation "3M DUAL-COLOR FILM 3635-210 WHITE") was hand laminated to the smooth side of the microstructured, cube corner, polycarbonate film resulting in a transflective sheet.

Example 7

A light assembly was constructed as described in Example 2, except that the transflective sheet was made according to Example 6. The light from this assembly appeared uniform across the light assembly.

Example 8

A perforated window film with 30% open area (available from 3M Company under the trade designation "3M DUAL-COLOR FILM 3635-210 WHITE") was hand laminated to the smooth side of the hex patterned film made in Example 1.

Example 9

A perforated window film with 30% open area (available from 3M Company under the trade designation "3M DUAL-COLOR FILM 3635-210 WHITE") was hand laminated to the microstructured side of the hex patterned film made in Example 1.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A transflective article comprising:
a first layer having a major surface having a plurality of apertures therein;
a second layer having a major transflective surface having reflectivity greater than that dictated by Fresnel equations at normal incidence, given by $$R = \frac{(n-1)^2}{(n+1)^2},$$

R being reflectance at normal incidence and n being refractive index; and
a third layer having a major surface having a plurality of apertures therein.

2. The transflective article of claim 1, wherein the major transflective surface faces away from the apertures of the first layer.

3. The transflective article of claim 1, wherein the major transflective surface faces toward the apertures of the first layer.

4. A light assembly comprising:
the transflective article of claim 1;
an outer light cover having an outer major surface;
a reflector having an inner major surface, wherein the transflective article is disposed between the outer major surface of the outer light cover and the inner major surface of the reflector; and
a first light source,
wherein there is an optical cavity between the transflective article and the reflector, wherein the transflective surface face the light source, and wherein the first light source is positioned to introduce light into the optical cavity.

5. A light assembly comprising:
an outer light cover having an outer major surface;
the transflective article of claim 1;
a reflector having a inner major surface, wherein the transflective article is disposed between the outer major surface of the outer light cover and the inner major surface of the reflector; and
a first light source,
wherein there is an optical cavity between the outer light cover and the reflector, and wherein the first light source is positioned to introduce light into the optical cavity, wherein the inner major surface of the reflector is oriented to the transflective surface so that the separation between the two surfaces decreases along a distance away from the light source.

6. A light assembly comprising:
an outer light cover having a first and second generally opposed major surfaces, and a first zone having a first color, and a second zone having a second, at least one of different color or being clear, the second major surface being an inner major surface;
a reflector having an inner major surface that is parallel to at least 30 percent of the inner major surface of the outer light cover;
the transflective article of claim 1 disposed between the outer light cover and the reflector;
wherein there is an optical cavity between the transflective surface and the inner major surface of the reflector, and wherein the first light source is selected and positioned to introduce light into the optical cavity such that, when energized, provides the same color for the first and second zones when viewed from the first major surface of the outer cover.

7. The transflective article of claim 4, wherein the major transflective surface faces away from the apertures of the first layer.

8. The transflective article of claim 4, wherein the major transflective surface faces toward the apertures of the first layer.

9. The transflective article of claim 5, wherein the major transflective surface faces away from the apertures of the first layer.

10. The transflective article of claim 5, wherein the major transflective surface faces toward the apertures of the first layer.

11. The transflective article of claim 6, wherein the major transflective surface faces away from the apertures of the first layer.

12. The transflective article of claim 6, wherein the major transflective surface faces toward the apertures of the first layer.

* * * * *